(12) United States Patent
Pulitzer

(10) Patent No.: US 11,659,124 B2
(45) Date of Patent: May 23, 2023

(54) KINEMATIC ASSESSMENT AND VERIFICATION OF PAPER DOCUMENTS FOR PROCESSING AND ANALYSIS THEREOF

(71) Applicant: Tesla Laboratories, LLC, Jackson, WY (US)

(72) Inventor: Jovan Hutton Pulitzer, Frisco, TX (US)

(73) Assignee: TESLA LABORATORIES, LLC, Jackson, WY (US)

( * ) Notice: Subject to any disclaimer, the term of this patent is extended or adjusted under 35 U.S.C. 154(b) by 0 days.

(21) Appl. No.: 17/544,738

(22) Filed: Dec. 7, 2021

(65) Prior Publication Data

US 2022/0210292 A1 Jun. 30, 2022

Related U.S. Application Data

(60) Provisional application No. 63/122,318, filed on Dec. 7, 2020.

(51) Int. Cl.
*H04N 1/32* (2006.01)
*H04N 1/047* (2006.01)
*G07C 13/02* (2006.01)

(52) U.S. Cl.
CPC ......... *H04N 1/32352* (2013.01); *G07C 13/02* (2013.01); *H04N 1/047* (2013.01)

(58) Field of Classification Search
CPC .............. H04N 1/32352; H04N 1/047; H04N 1/00846; H04N 1/00848; H04N 1/00724; H04N 1/00681; H04N 1/00798; H04N 1/00795; H04N 1/00838; H04N 2201/32; H04N 2201/3269; H04N 2201/323; H04N 2201/3245; G07C 13/02
See application file for complete search history.

(56) References Cited

FOREIGN PATENT DOCUMENTS

GB 2284123 A * 5/1995 ............... G07D 7/12

* cited by examiner

*Primary Examiner* — Christopher Wait
(74) *Attorney, Agent, or Firm* — Gregory M. Howison

(57) ABSTRACT

A see through apparatus receives a paper document. The see through apparatus includes a first scanning element, a second scanning element, and a processor coupled to the first scanning element and the second scanning element. Each of the first and second scanning elements illuminate a respective side of the paper document while the other scanning element captures an image. The processor detects kinematic artifacts on the paper document and determines that the paper document is fraudulent based on the detected kinematic artifacts. The processor also detects an alignment feature from the image capture from the first image or the second image, and determines that the document is not aligned based on the detected alignment feature.

1 Claim, 16 Drawing Sheets

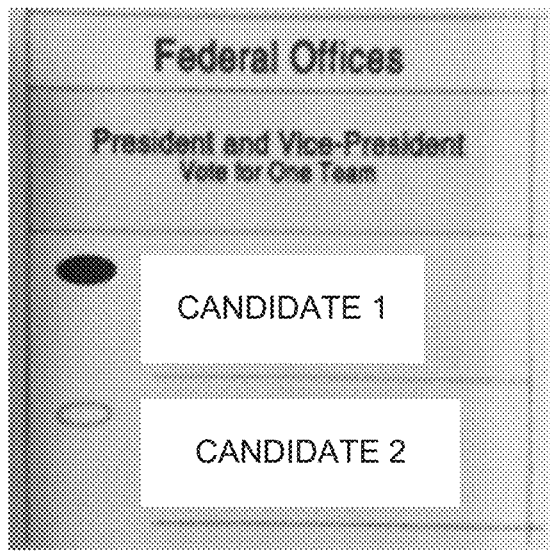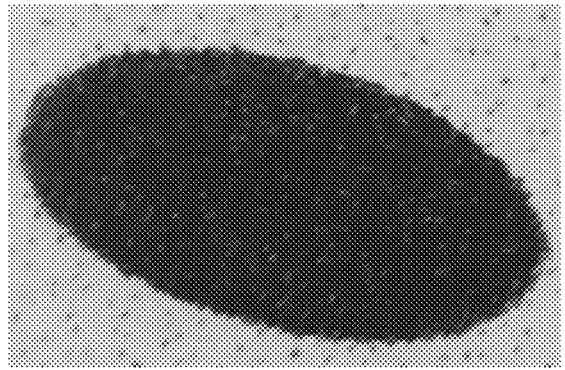
FIG. 8I　　　　　　　　　　FIG. 8J
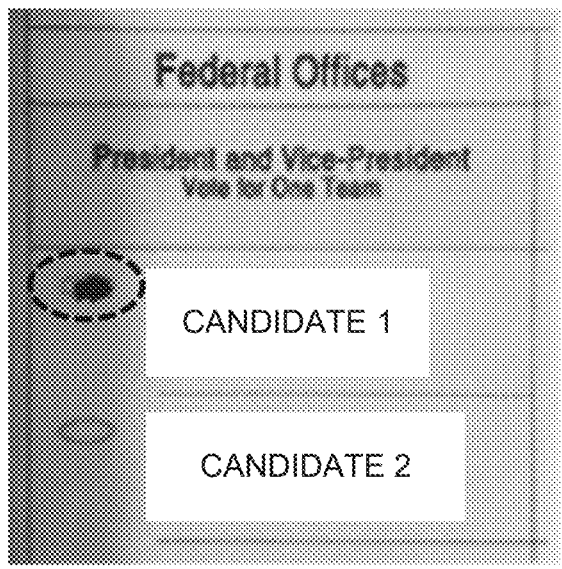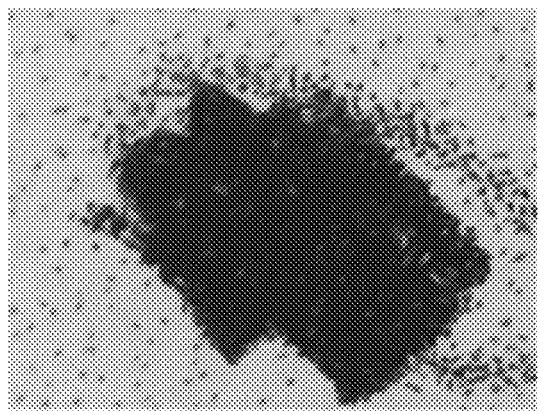
FIG. 8K　　　　　　　　　　FIG. 8L

KINEMATIC ASSESSMENT AND VERIFICATION OF PAPER DOCUMENTS FOR PROCESSING AND ANALYSIS THEREOF

CROSS-REFERENCE TO RELATED APPLICATIONS

This application claims the benefit of U.S. Provisional Application No. 63/122,318, filed on Dec. 7, 2020, entitled AUTOMATED FRAUD ASSESSMENT KINEMATIC ELEMENTS, which is incorporated by reference in its entirety.

TECHNICAL FIELD

This disclosure relates to kinematic assessment devices and processes for using the assessment results to assist in processing documents. More specifically, this disclosure relates to kinematic assessment of paper documents.

BACKGROUND

A large number of paper documents are printed every year for many purposes, some of which include modifications thereof that must be authenticated. Some paper documents have specific alignment requirements and specific and unique signatures that must be verified. Methods and apparatus for assessing various verification aspects of a paper document need improving.

SUMMARY

This disclosure provides kinematic assessment and verification of paper documents for processing and analysis thereof.

A see through apparatus receives a paper document. The see through apparatus includes a first scanning element, a second scanning element, and a processor coupled to the first scanning element and the second scanning element. Each of the first and second scanning elements illuminate a respective side of the paper document while the other scanning element captures an image. The processor detects kinematic artifacts on the paper document and determines that the paper document is fraudulent based on the detected kinematic artifacts. The processor also detects an alignment feature from the image capture from the first image or the second image, and determines that the document is not aligned based on the detected alignment feature.

Various technical features may be readily apparent to one skilled in the art from the following figures, descriptions, and claims.

BRIEF DESCRIPTION OF THE DRAWINGS

For a more complete understanding, reference is now made to the following description taken in conjunction with the accompanying Drawings in which:

FIGS. 8A through 8L illustrate fill patterns for response area bubbles on paper documents from an eye subject viewpoint and a computer vision analysis in accordance with this disclosure;

DETAILED DESCRIPTION

Figure 1:
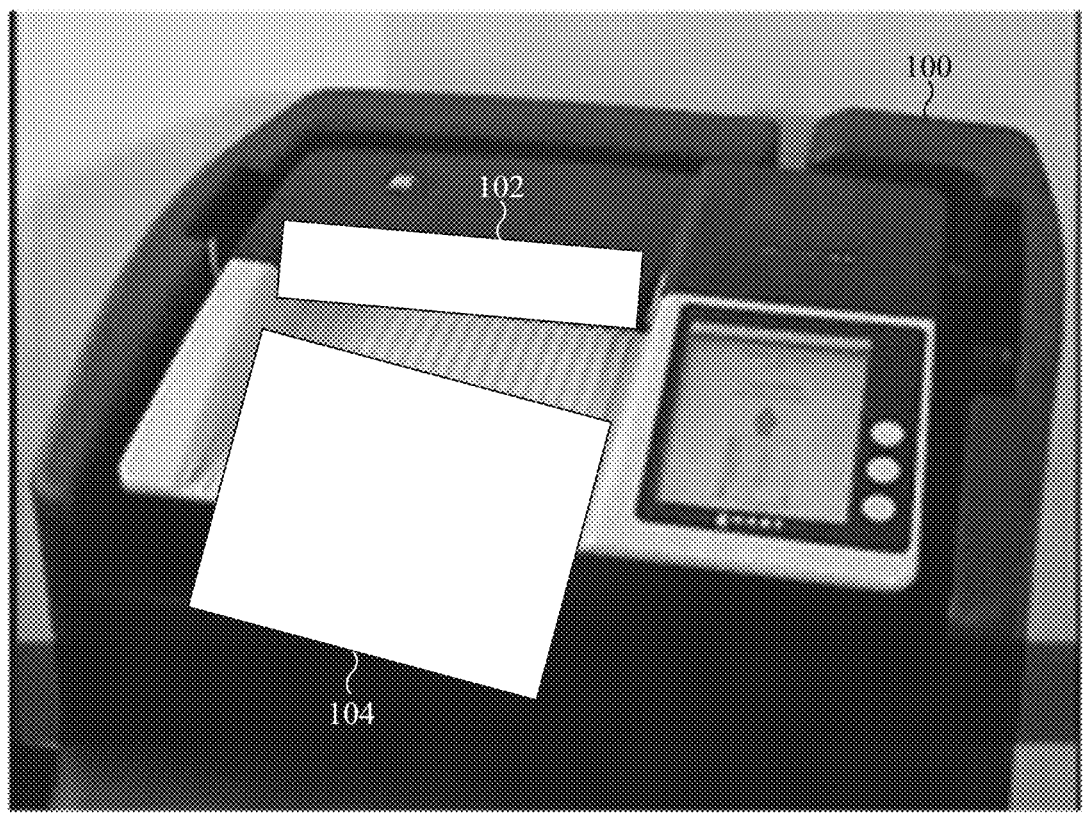
FIG. 1 illustrates an exemplary kinematic assessment machine used for processing paper documents in accordance with this disclosure.

Referring now to the drawings, wherein like reference numbers are used herein to designate like elements throughout, the various views and embodiments of automated fraud assessment and verification of kinematic elements associated with paper documents are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

When machines perform and print documents they must operate within "hard rules," such as "where to print," "what flow/viscosity" and "fill to what tolerance (as with the oval space or square space allotted for human interaction)." Thus, machines can only operate within the "hard rules" as they duplicate documents. Accordingly, machines are programmed and manufactured with extreme exacting tolerance measures.

When humans perform manual functions (such as filling in a paper document) they inherently operate within "soft rules". Soft rules mean not have an exacting mathematical measuring system to gauge and perform each function but are guided with visual guidance systems that are as good as the acuity of their individual eyesight. Soft rules mean the human element inputs are wildly variable and not exact or consistent. Additionally, additional human dynamic artifacts are present in each and every transaction.

Paper documents printed in mass during a relatively short window in order would be present over and above the paper document being "devoid of kinematic artifacts," "code irregularities" and other nefarious inferences, such as missing envelopes, surge patterns and batch feeding patterns. These additional indicators would be within at least three areas which can be rapidly determined by traditional computer vision methods (feeding of paper document through an optics system). These three areas are not exhaustive as to possible areas. An additional indicator can include the human dynamics of ink placement and disbursement (disbursement defined as (i) proper disbursement; (ii) surface energy; (iii) dwell time; (iv) print head; and (v) pigment interactions (in human dynamics all variable/dynamic soft rules). Other additional indicators can include the machine dynamics of ink placement and disbursement (disbursement defined as (i) proper disbursement; (ii) surface energy; (iii) dwell time; (iv) print head; and (v) pigment interactions (in machines all fixed hard rules).

The process of printing the ballot itself is a direct reflection of hard rules required by machines. Similar to the lines making up the courts and fields in sports, the lines on paper documents are provided by hard rules. Breaking the hard rules requires accessing a penalty. using the sports comparison as an example, stepping out of bounds incurs a penalty of a turnover or stop of play. The voting machines that print 100% of the ballots are subjected to these rules, which are reflected mathematically in the ballots.

FIG. 1 illustrates a kinematic assessment machine 100 in accordance with this disclosure. The embodiment of the kinematic assessment machine 100 illustrated in FIG. 1 is for illustration only. FIG. 1 does not limit the scope of this disclosure to any particular implementation of an electronic device.

This application provides a system and methods for quickly determining proper alignment of documents and determining documents not properly aligned. The documents identified as not properly aligned can be considered faulty and removed from the production.

As shown in FIG. 1, a kinematic assessment machine 100 is an apparatus for determining whether paper documents 104 are misaligned. The kinematic assessment machine 100 can include a paper document authenticator 102. The kinematic assessment machine 100 can receive a paper document 104 through a receiving tray. The kinematic assessment machine 100 can further include components for detecting alignment of dual sided paper documents 104. The kinematic assessment machine 100 can perform any standard procedure for determining alignment of the dual sided paper documents 104.

The paper document authenticator 102 can be integrated into existing components of the kinematic assessment machine 100 or an external module that is combined with the kinematic assessment machine 100.

The paper document authenticator 102 reads and authenticates each paper document 104. The paper document authenticator 102 can be integral with the kinematic assessment machine 100, physically coupled to the kinematic assessment machine 100, electrically coupled to the kinematic assessment machine 100, communicatively coupled to the kinematic assessment machine 100, or completely separate from the kinematic assessment machine 100. In certain embodiments, the paper document authenticator 102 could be implemented as software loaded on an electrical device, such as a cell phone. The paper document authenticator 102 can determine whether a paper document is authentic and provide an indication of the authenticity to a user of the kinematic assessment machine 100. Specific indicators of machine-printed vs. human completed paper documents can be rapidly determined by computer vision methods, including identification of kinematic artifacts, inferential statistical analysis, near-duplicate image detection, etc.

Identification of kinematic artifacts is a process for identifying visual and forensic signs of markers created as a result of being dominated by kinematics of folded papers. Quickly duplicated paper documents of a nefarious nature should be devoid of kinematic artifacts or markers. All postal paper documents should exclusively show the visual and forensic signs of markers created as a result of being dominated by the kinematics of the folding. For instance, an unfolded, pristine paper document has a low likelihood of being sent through the mail. It would be nearly impossible for a paper document to appear this way through the mail.

Even a user taking the utmost amount of care to preserve the pristine nature of the paper document would still have to send through the postal service or the person moving the paper documents from the drop box to the counting facilities. Additionally, differences can exist between a paper document folded by a machine prior to delivery by mail and folded by hand.

During the analysis of a paper document, various analysis tools may be used, one of which is "Bayesian Probability" that is applied to a digitized version of a given paper document or an optical analysis of the paper document. It should be understood that all or any portion of a paper document can be analyzed by multiple analysis techniques. The paper document, in one example, could be digitized and stored as a digital file, and all or a portion of the digitized file analyzed. This digitization could be facilitated with a scanner, or an optical camera. The goal in digitization is to convert an optical analog form of the paper document, i.e., the visual image that can be viewed by a person, to a plurality of digital pixels. Additionally, this digitized form would preferably have a relatively high resolution so that any portion of the original paper document can be thoroughly analyzed after digitization. It is important to understand that the human eye averages any portion of something that is being viewed in a given scene, whereas the high resolution pixilated and digitized form can be analyzed by a computer to extract considerably more information from a given scene/image, as compared to the human eye.

The visual evidence of paper documents being "devoid of kinematic artifacts" is, in one example, defined as a situation where a paper document could be determined to have been processed in other than an expected manner. For example, if the paper document were to be involved in a process requiring a rigid sequence of handling steps, such as a paper voting ballot, the process would require handling form and the result of each handling step would have associated there with some type of kinematic artifact. In one example, the sequence to create this paper voting ballot could be required to follow the following: 1) define a particular paper stock that is unique, and which can be examined to determine the type of paper stock, the size of the paper document, the type of fiber associated therewith and optical characteristics that would be uniquely associated therewith, 2) print information on the unique paper document created with a printer that can be uniquely identified via its optical properties associated with the ink and with potential identifying code buried in the text, this possibly even involving some type of hidden digital watermark, 3) print unique registration marks on the paper voting ballot that must be placed at a particular location relative to the defined edges of the paper voting ballot, 4) machine fold the printed paper voting ballot, 5) insert the machine folded printed paper voting ballot in an envelope and seal such envelope, and 6) mail the sealed envelope via the US postal office, such that the enclosed paper voting ballot would be subjected to various machines controlled by the US postal office having rollers in the such that would leave certain kinematic artifacts on the paper voting ballots indicating interface of the paper voting ballots with such rollers and the such associated with the various US Post Office processing machines. In this example, a paper voting ballot, after processing at a voting facility would be expected to have kinematic artifacts associated with each step of the above process. If it could be determined that the particular paper stock was not as expected, Inc. associated with printing was not as expected, the registration mark was not as expected, there was no fold or it was determined that the fold was done by human, or that there were no indication of any processing marked expected from processing a document through US postal office, each of these could be considered being "devoid of kinematic artifacts."

Such a situation above could occur when only recently printed paper ballots that were not mailed were then fed "en mass" into voting systems this could indicate that process paper voting ballot was not mailed out to a potential voter, nor was the paper document completed by a potential voter and mailed back in according to established voting procedures. Even paper documents 104 mailed once (to potential voters) would have a 100% forensic trace of kinematic artifacts. Bayesian probability can be utilized in one form of analysis, as it is an interpretation of the concept of probability, in which, instead of frequency or propensity of some phenomenon, probability is interpreted as reasonable expectation representing a state of knowledge or as quantification of a personal belief.

The inferential statistical analysis determines randomness of the information filled in on the paper document. A paper document 104 filled out by a human would display indisputable randomness. The randomness could be determined based on distinct handwriting style and rhythm. The distinctiveness of a pencil or identifiable ink pen, which is discernable from instrument ink.

Both thin-layer chromatography and capillary electrophoresis can determine if any postal paper document was filled in by human hand and with the use of a random writing instrument. If a paper document is to represent one individual registered voter's legal vote (specifically from a mail-in paper document perspective) then each paper document would be subject to the random nature of two indisputable facts. First, the individual completing the paper document has a distinct handwriting style and rhythm and such would be evident in the marking of the paper document by hand. Second, for most of the paper documents, voters are instructed to "use only a pencil or ink pen (black or blue) to mark your paper document."

A statically probability can be determined on a basis of determining whether a paper document being was filled in by hand or was the paper document "machined completed." The following are the kinematic variances that would be present if the paper documents were complete by a random selection of voters at home.

The relevance of being devoid of kinematic variances: Sampling of any number of paper documents (mail-in) submitted should have present characteristics of "random article of commerce" distribution and market share patterns. In other words, forensically, the writing instrument used can be determined and that use of that instrument use should directly equate the manufacturers market share for a particular market. Conversely, if a mechanical or systematically organized method of nefarious completion of paper documents will reveal itself in the chemical patterns of the paper documents.

Examples expected variances could be: (i) if the paper documents were subject to a machine printed single run, the ink dot would be expected to match the ink formulation used for paper document, or; (ii) if the paper documents were subject to a machine printed double run, the ink dot be expected to be of a different ink BUT occur in succession or in propensity of the same "second ink" on subsequent paper documents or, alternatively, the majority of paper documents, and finally; (iii) if traditional ball point pens were used to manufacture paper documents, then two patterns would emerge based on the following market fact: ink companies keep their exact ink formulas well-guarded, but almost all ballpoint pen inks consist of one or more color pigments or dyes dissolved or suspended in a solvent. Thus, the chemical signature can show a systematic use of one type of pen in bulk or display a systematic swapping of pens in a measurable pattern of rotation.

Near-duplicate image detection can be performed on the paper document to determine repetition of paper documents 104. For example, machine duplicated paper documents can be devoid of random fill, form and artifacts. The paper document authenticator 102 can compare the information provided in multiple paper documents in order to identify machine repetition. Machine duplicated paper documents (printed with votes or subjected to systematic nefarious efforts) would be subject to fraud detection based on what is considered "near-duplicated image analysis." If postal votes, i.e., those that were mailed to the US postal office, were mechanically inserted they would display a propensity for (i) common placement and (ii) equidistant characteristics, which are two different detection techniques. Near-duplicate image detection would catch possibly the same nefarious activities my mechanized means of that which thin-layer chromatography and capillary electrophoresis would expose but can be done on a faster basis en masse.

For example, if an individual could handle a paper document and mark it individually at an estimated a twenty second process per paper document (which with human variances for attention would actually extend the time), 800,000 paper documents would take 9.2592593 continuous days to complete. If this was done on any scale for any voting area in real time, to generate this number of votes would by necessity have to of had been mechanized in order to maintain such printing "safe from exposure." Considering, for example, a six-hour window if such things were manually created by human "after seeing votes come in," this would of have taken 222.22 hours or 180 paper documents completed by person per hour. Considering a six-hour window, this effort in human terms would take ninety three people per hundred thousand paper documents. This would realistically lean towards mechanization in order to achieve the correct results.

Although FIG. 1 illustrate a kinematic assessment machine 100, various changes may be made to FIG. 1. For example, the sizes, shapes, and dimensions of the kinematic assessment machine 100 and its individual components can vary as needed or desired. Also, the number and placement of various components of the kinematic assessment machine 100 can vary as needed or desired. In addition, the kinematic assessment machine 100 may be used in any other suitable paper document counting process and is not limited to the specific processes described above.

Figure 2:
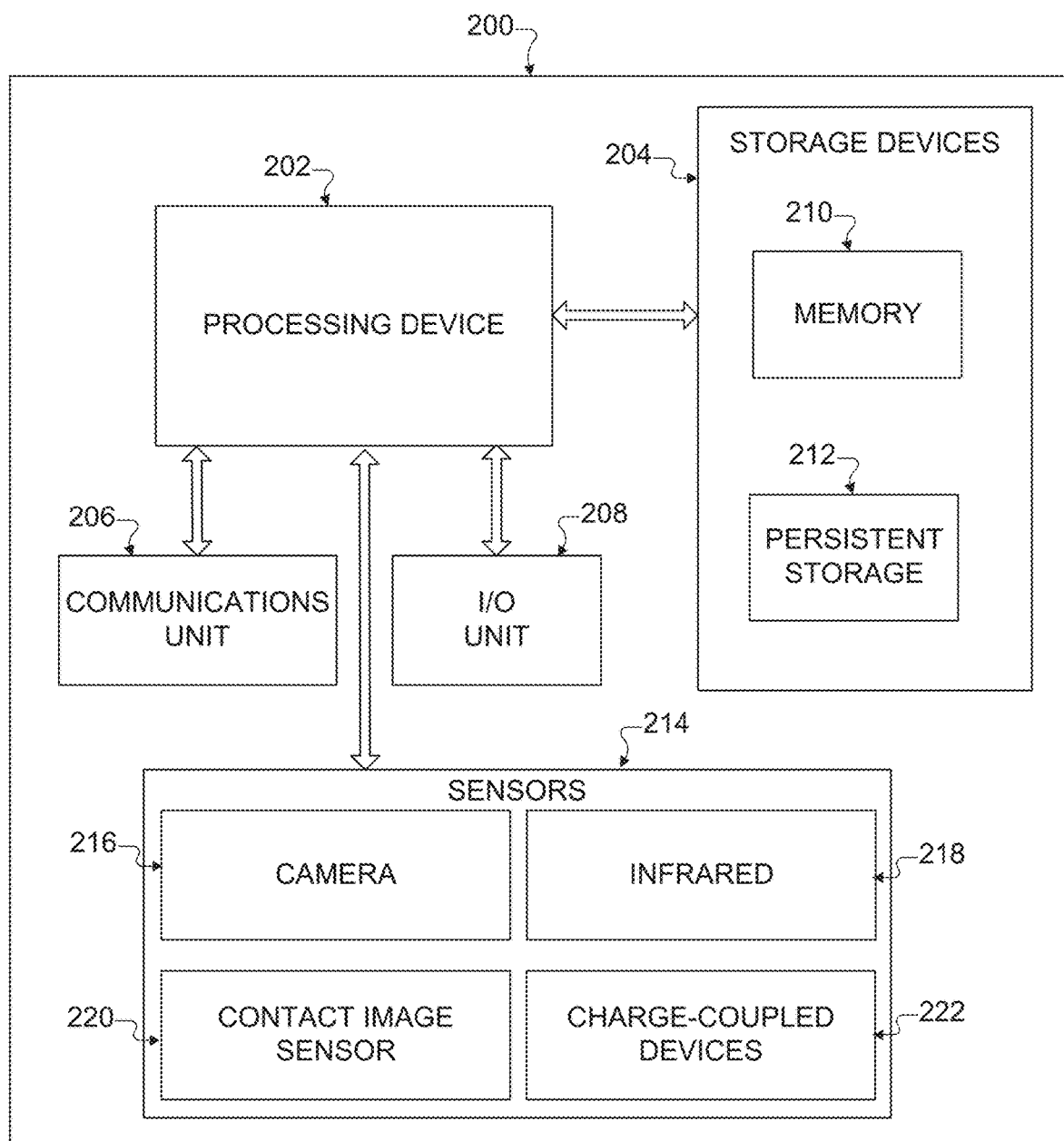
FIG. 2 illustrates an exemplary paper document authenticator in accordance with this disclosure.

FIG. 2 illustrates an example paper document authenticator 102 for automated fraud assessment kinematic elements according to this disclosure. One or more instances of the paper document authenticator 102 (or portions thereof) may, for example, be used to at least partially implement the functionality of the kinematic assessment machine 100 of FIG. 1. However, the functionality of the kinematic assessment machine 100 may be implemented in any other suitable manner.

As shown in FIG. 2, the paper document authenticator 102 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, DSPs, ASICs, GPUs, FPGAs, or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the paper document authenticator 102 does not require local I/O, such as when the paper document authenticator 102 can be accessed remotely or operated autonomously.

In some embodiments, the instructions executed by the processing device 202 can include instructions that implement all or portions of the functionality of the kinematic assessment machine 100 described above. For example, the instructions executed by the processing device 202 can include instructions for automated fraud assessment kinematic elements as described above.

Although FIG. 2 illustrates one example of a paper document authenticator 102 for automated fraud assessment kinematic elements, various changes may be made to FIG. 2. For example, computing devices and systems come in a wide variety of configurations, and FIG. 2 does not limit this disclosure to any particular computing device or system.

FIG. 3 illustrates a paper document 104 in accordance with this disclosure. The embodiment of the paper document 104 illustrated in FIG. 3 is for illustration only. FIG. 3 does not limit the scope of this disclosure to any particular implementation of a paper document.

As shown in FIG. 3, the paper document 104 can have printing on both a front side 300 and a back side 302. The paper document can include a number of features including a title 304, user information 306, location information 308, a QR code 310, descriptive text 312, response bubble area 314, corresponding form information or corresponding envelope information 316, a signature area 318, a front alignment marker 320, a back alignment marker 322, etc.

The printing on each side of the paper document 104 can be applied one side at a time or on special printers that print on both sides. For one-sided printers, the paper document 104 can be refed by the kinematic assessment machine 100 or refed by a user. Printing on both sides of the paper document may not be the same but can require specific alignment. When the paper document is refed, the kinematic assessment machine 100 can determine whether the alignment is correct. With respect to alignment, if the alignment is not correct, what typically happens is that the ballot that is fed into the machine is rejected. In such a situation, a human individual then adjudicates the ballot and actually interprets what was on the ballot and enter such information manually into the voting system. This could potentially result in a different individual entering the vote then the one filling out the voting ballot. If, for some reason, the alignment mark were misaligned original printed ballot, this could result in a large number of ballots being rejected.

The title 304 information can provide a general description of contents or purpose of the paper document 104. The title 304 can be located on the front side of the paper document 104. The kinematic assessment machine 100 can be programmed for printing the title 304 in a position, font, etc. The printing of the title 304 in the kinematic assessment machine 100 can also be used for identifying and authenticating the paper document 104. For example, the kinematic assessment machine 100 can read the title 304 of the paper document 104 and compare the title 304 to one or more of the other aspects of the paper document 104. The kinematic assessment machine 100 can assess the location, the size, the shape, the font, or any other aspect of the title 304 when authenticating paper document 104.

In certain embodiments, the title 304 includes an outline around an area for the title 304. The edges of the outline can be compared to an edge of the paper document 104 or to other components of the paper document 104. In some embodiments, the outline or the title 304 can be compared to one of the components on the back side 302 of the paper document 104.

For each of the outlines below, the outlines can have a known or specified structure and can also have known or specified relation with other outlines. In certain embodiments, the outline of the title 304 can have top and bottom side that are parallel with a right and a left side that are parallel. The outline of the title 304 can have left and right sides that are perpendicular to the top and bottom sides. In certain embodiments, the outline can have slightly oblique angles for purposes of authentication or alignment by the kinematic assessment machine 100. For example, the title 304 can have right side of the outline form an oblique angle with the top side and the bottom side of the outline. Altering an obliqueness for one or more of the lines in the outline can aid in identifying unauthenticated paper documents. For example, if the design of the paper documents 104 includes a right edge that is oblique to the top and bottom edges, the kinematic assessment machine 100 can determine that a paper document 104 with a left edge that is oblique to the top and bottom edges is not authentic. The altering of the shape of outlines for the different components of the paper document can also aid in the alignment process. Lines that make oblique angles with respect to adjacent edges on opposite sides of a paper document 104 can be identified easily and without prior knowledge of which lines are going to be altered. In other words, the kinematic assessment machine 100 can view the outlines of the components of the paper documents 104 and identify an edge of a component that is at an oblique angle to an adjacent edge and "look through" the paper document 104 to determine alignment. This method would not require prior knowledge of the alignment edges on the paper document 104.

A location of the title 304 or shape of the area of the title 304 can also be used by the kinematic assessment machine 100 to assess the alignment of the paper document 104. For example, the area of the title 304 can be identified and measured from the borders of the paper document 104 to have the alignment of the paper document 104 assessed by the kinematic assessment machine 100.

While illustrated on a front side 300 of the paper document 104, the title 304 could alternatively or dually be located on the back side 302 of the paper document 104. The kinematic assessment machine 100 can determine that the title 304 is misaligned based on comparing a location of the title 304 to an edge of the paper document 104. The kinematic assessment machine 100 can also determine that the title 304 is misaligned based on comparing the title 304 to other components on the front side 300 of the paper document 104. For instance, if a border of the title 304 is not parallel to an edge of the paper document 104, the kinematic assessment machine 100 can determine that the printing of the title 304 or the printing of the front side 300 is not aligned with the paper.

In certain embodiments, the title 304 on either the front side 300 or the back side 302 can be compared to a component of the paper document 104 on an opposite side of the paper document 104. For instance, the title 304 can be aligned on the front side 300 and the back side 302 of the paper document 104. The kinematic assessment machine 100 can determine that the paper document 104 is misaligned based on the distance of one edge from a center of the title 304 on the front side 300 to a center of the title 304 on the back side 302. The kinematic assessment machine 100 can determine that the paper document 104 is misaligned based on the border of the title 304 not aligning through the paper document 104 with a border on an opposite side of the paper document 104.

The kinematic assessment machine 100 can identify pertinent user information 306. The user information 306 can provide an identity of an individual completing the paper document 104. The user information 306 can be compared to a list in a separate database corresponding to the purpose of the paper document, for example, a student scheduled to take a test or a voter from a voter registration role. The kinematic assessment machine 100 can print an amount of paper documents 102 corresponding to an amount of test takers or paper document users and print each name in the user information 306 on a respective form. Other information of the user can also be included in the user information 306. For example, the user information 306 could include a mailing address, a phone number, a birthdate, specific user number, etc. The user information 306 can be used in confirming the correct user to fill out the paper document 104. For example, the user 306 could provide identification with an address, phone number, and/or birthdate to compare with the user information 306 printed on the paper document 104. The user information 306 can also be compared to a list in a database to authenticate the paper document 104 once the user has filled out the response.

The user information 306 can be located on the front side of the paper document 104. The kinematic assessment machine 100 can be programmed for printing the user information 306 in a position, font, etc. The printing of the user information 306 in the kinematic assessment machine 100 can also be used for identifying and authenticating the paper document 104. For example, the kinematic assessment machine 100 can read the user information 306 of the paper document 104 and compare the user information 306 to one or more of the other aspects of the paper document 104. The kinematic assessment machine 100 can assess the location, the size, the shape, the font, or any other aspect of the user information 306 when authenticating paper document 104.

In certain embodiments, the user information 306 includes an outline around an area of the user information 306. The edges of the outline can be compared to an edge of the paper document 104 or to other components of the paper document 104. For example, the kinematic assessment machine 100 can compare the edge of the outline for the user information 306 to the edge of an outline for the title 304. The lines around the user information 306 should be parallel or perpendicular to the lines around the title 304. In some embodiments, the outline or the user information 306 can be compared to one of the components on the back side 302 of the paper document 104.

A location of the user information 306 or shape of the area of the user information 306 can also be used by the kinematic assessment machine 100 to assess the alignment of the paper document 104. For example, the area of the user information 306 can be identified and measured from the borders of the paper document 104 to have the alignment of the paper document 104 assessed by the kinematic assessment machine 100. In certain embodiments, the user information 306 can have a known distance from the title 304. The distance can be from centers of the user information 306 and the title 304, offsets from an edge of the user information 306 and the title 304, space between the user information 306 and the title 304, etc. The kinematic assessment machine 100 can also use a combination of distances between the user information 306, the title 304, and/or an edge of the paper document 104 for determining alignment. In certain embodiments, the distance can be different but known. For instance, an offset of the user information 306 from an edge of the paper document 104 can be smaller or larger than an offset of the title 304 from an edge of the paper document 104.

While illustrated on a front side 300 of the paper document 104, the user information 306 could alternatively or dually be located on the back side 302 of the paper document 104. The kinematic assessment machine 100 can determine that the user information 306 is misaligned based on comparing a location of the user information 306 to an edge of the paper document 104. The kinematic assessment machine 100 can also determine that the user information 306 is misaligned based on comparing the user information 306 to other components on the front side 300 of the paper document 104. For instance, if a border of the user information 306 is not parallel to an edge of the paper document 104, the kinematic assessment machine 100 can determine that the printing of the user information 306 or the printing of the front side 300 is not aligned with the paper.

In certain embodiments, the user information 306 on either the front side 300 or the back side 302 can be compared to a component of the paper document 104 on an opposite side of the paper document 104. For instance, the user information 306 can be aligned on the front side 300 and the back side 302 of the paper document 104. The kinematic assessment machine 100 can determine that the paper document 104 is misaligned based on the distance one edge from a center of the user information 306 on the front side 300 to a center of the user information 306 on the back side 302. The kinematic assessment machine 100 can determine that the paper document 104 is misaligned based on the border of the user information 306 not aligning through the paper document 104 with a border on an opposite side of the paper document 104.

In certain embodiments, the user information 306 can be compared to another component on an opposite side, such as the title 304. The user information 306 can be located on one side of the paper document 104 and the title 304 can be located on an opposite side of the paper document 104. The user information 306, when viewed through the paper document 104, can align with the title 304 in some manner. For example, a center of the user information 306 on the front side 300 of the paper document 104 can be centered with the title 304 on the back side 302. In another example where the areas or the boxes are different for the title 304 and the user information 306, a corner of the outline for the user information 306 can be aligned with a corner of the title 304 on opposite sides of the paper document 104. The kinematic assessment machine 100 can determine alignment of the printing on the paper document 104 based on aligning the corners of the user information 306 and the title 304 through the paper document 104.

The kinematic assessment machine 100 can identify location information 308 on the paper document 104. The location information 308 can include location information related 308 to the paper document itself. In certain embodiments, the location information 308 can include information related to a printing location of the paper document. For example, for some standardized test, paper documents 104 are printed throughout a country, such as the United States. The paper documents 104 need to be somewhat standardized for every test taker or voter regardless of location. In other embodiments, the tests or the vote layout can be standardized based on region, state, county, etc. When the paper documents 104 are returned for assessment, the kinematic assessment machine 100 can compare the location information 308 of the printer with other location information to authenticate the paper document 308.

In certain embodiments, the location information 308 can be related to a location that the paper document 104 is to be delivered. The delivery location can be to a specified organization that is administering the test or vote tabulation and the location information 308 can be used to authenticate that the correct organization is receiving the paper documents 104. Each administering location can have a kinematic assessment machine 100 that authenticates the paper documents 104 before and/or after the paper documents 104 have been completed. For instance, when the location information 100 for a specific administering location includes a mistake for that address or identifies a different administering location on the paper document 104, the kinematic assessment machine 100 can determine that the paper document 104 is not authenticated for that administering location address.

In certain embodiments, the location information can be related to a location at which the paper document 104 is to be completed. The location can be to a specified building or address where the test is being administered and the location information 308 can be used to authenticate that it is the correct location for completing the paper documents 104. Each location can have a kinematic assessment machine 100 that authenticates the paper documents 104 before and/or after the paper documents 104 have been completed. For instance, when the location information 100 for a specific location includes a mistake for that address or identifies a different location on the paper document 104, the kinematic assessment machine 100 can determine that the paper document 104 is not authenticated for that location address where the paper document is to be completed.

The location information 308 can be located on the front side of the paper document 104. The kinematic assessment machine 100 can be programmed for printing the location information 308 in a position, font, etc. The printing of the location information 308 in the kinematic assessment machine 100 can also be used to for identifying and authenticating the paper document 104. For example, the kinematic assessment machine 100 can read the location information 308 of the paper document 104 and compare location information 308 to one or more of the other aspects of the paper document 104. The kinematic assessment machine 100 can assess the location, the size, the shape, the font, or any other aspect of the location information 308 when authenticating paper document 104. For example, the location information 308 can be designed to be printed below the user info 306 of the paper document. When the location information 308 is not below the user information 306, the kinematic assessment machine 100 can determine that the paper document 104 is not authentic. As another example, the location information 308 can be designed to be narrower across a width of the paper document 104 and longer in a height of the paper document. When these relations in size are different, the kinematic assessment machine 100 can determined that the paper document 104 is not authentic. As another example, the location information can have a larger total area than the user info 306 but a smaller overall area than the title. The kinematic assessment machine 100 can authenticate the paper document 104 based on the relation between the sizes of one or more of the components on the paper document 104.

In certain embodiments, the location information 308 includes an outline around an area for the location information 308. The edges of the outline can be compared to an edge of the paper document 104 or to other components of the paper document 104. A top edge of the location information 308 can be offset from a lower edge of the user information 306. The left and right edges of the location information 308 can be parallel to the right and left edges of the user information 306. The location information 308 can be aligned with user information 306, the title 304, or both. The kinematic assessment machine 100 can determine that the paper document is authentic or aligned based on the spatial relationships of the location information 308, the user information 306 and the title 304.

In some embodiments, the outline of the location information 308 can be compared to one of the components on the back side 302 of the paper document 104. For example, the location information 308 can be compared to either the user information 306 or the title 304 located on opposite side of the paper document 104.

A location of the location information 308 or shape of the area of the location information 308 can also be used by the kinematic assessment machine 100 to assess the alignment of the paper document 104. For example, the area of the location information 308 can be identified and measured from the borders of the paper document 104 to have the alignment of the paper document 104 assessed by the kinematic assessment machine 100.

While illustrated on a front side 300 of the paper document 104, the location information 308 could alternatively or dually be located on the back side 302 of the paper document 104. The kinematic assessment machine 100 can determine that the location information 308 is misaligned based on comparing a location of the location information 308 to an edge of the paper document 104. The kinematic assessment machine 100 can also determine that the location information 308 is misaligned based on comparing the location information 308 to other components on the front side 300 of the paper document 104. For instance, if a border of the location information 308 is not parallel to an edge of the paper document 104, the kinematic assessment machine 100 can determine that the printing of the location information 308 or the printing of the front side 300 is not aligned with the paper.

In certain embodiments, the location information 308 on either the front side 300 or the back side 302 can be compared to a component of the paper document 104 on an opposite side of the paper document 104. For instance, the location information 308 can be aligned on the front side 300 and the back side 302 of the paper document 104. The kinematic assessment machine 100 can determine that the paper document 104 is misaligned based on the distance one edge from a center of the location information 308 on the front side 300 to a center of the location information 308 on the back side 302. The kinematic assessment machine 100 can determine that the paper document 104 is misaligned based on the border of the location information 308 not aligning through the paper document 104 with a border on an opposite side of the paper document 104.

In certain embodiments, the QR code 310 can include information related to the arrangement, sizes, and any other distinguishing features of the components of the paper document 104. For example, the paper document authenticator 102 can scan the QR code 310 and determine which features to check for authentication and alignment of the paper document 104. Storing the authentication and alignment information in the QR code 310 can reduce the opportunity for nefarious actors to manipulate the system. The QR code 310 can be designed in a manner that the paper document authenticator 102 can read the QR code 310 to identify authentication and alignment information that a typical QR code reader may not be able to identify.

The paper document authenticator 102 can perform QR-code fraud detection to determine BDM irregularities or can perform repetition and frequency fraud detection. Systems which utilized QR Codes as the encoding mechanism have built in tracking systems. These identifiers being tagged can include official paper document designation, election title, date, the party, county name, seal, paper document style, precinct number, serial number (a numeric identification for the precinct), measured response identifier (who is being voted for), voter selection identifications numbers. Encoding can identify the voter selection identifications in the same order in which they are printed on the paper document. The QR code can be used by the various tally systems to read and process the votes cast on the paper document. These QR codes can be used to detect voter fraud and election fraud in several ways.

A first way to detect fraud can include conducting routine logic and accuracy testing on all paper document styles as soon as printed paper documents 104 are delivered. This logic and accuracy test is completed prior to mailing or issuing any paper documents to voters. Most fail to run this check and the lack of this check is more common when multiple postal paper documents 104 are sent far in advance of a due date for return of the document. The paper document authenticator 102 can perform a Coding Accuracy Support System (CASS) certification (postal barcode) to showing a postal paper document 104 was actually mailed in the received envelope. The paper document authenticator 102 matches an envelope QR code to a voting paper document QR code. The paper document authenticator 102 can determine whether a code is repeated within a voting system. Repetition of codes could denote a "copied paper document" meaning a higher probability that it was copied on a copy machine and inserted into the system numerous times. Currently, the various voting systems do not account for "duplicate codes." As a general note, the codes issued correspond to how and where the an authorized individual completes the paper document. This makes an original unique code a new code by default, showing as, for example, a vote and who they voted for. However, the original code reflects a no vote since the paper document is supposedly blank at the onset.

Repetition of the code can also be identified based on format frequency. Format frequency meaning a particular "selection of candidate format." Humans are inherently lazy and nefarious votes being cast by lazy humans would tend to not vote anything other than for a primary candidate such as a president or another primary concern in an election. Thus, the "selection of candidates" becomes a subsequent "readable pattern" in the voting system. The readable pattern, when repeated in propensity, becomes an "identifying code itself" This statistic, compared to a "global compare," the comparison of all paper documents cast, and "party compare," the comparison of all paper documents compared within a party set, further creates a comparable pattern. The global compare and party compare can be applied local, state and nationwide, potentially using "format frequency" to reveal election fraud. The format frequency can also be compared to "control teams" or "vote handlers" to determine and identify possible irregularities.

Another example of possible irregularities can include checking an amount of codes issued and mailed. The paper document authenticator 102 can determine whether more codes were reported than were issued or mailed. More codes being reported would indicate some election fraud. Another authentication measure is to compare a name on submitted paper document with a name on an envelope in which the paper document was mailed.

In certain embodiments, the paper documents 104 can include voting ballots. QR Codes can be printed on the voting ballots. QR codes can have encoded information that identifies a user in a particular group, location, etc. If such QR codes was opted for, and the system execute a functional routine of the "voters who voted and their affiliation (global set)" and compared this result to voters whose votes show different than party affiliation and then show the "overall variances." Such a variance could indicate a trend for "x" to vote for a different party this time around, but that "x" in certain areas shows itself as "xx" or "xxx" (local, state or national), then there is a distinct probability the systems are reading the "party affiliated designation" and changing votes in system.

Each paper document can be coded for "return postage". Although individuals can manually deliver the ballots to a designated return area, more paper documents can be returned in the mail during a time, such as a pandemic. The returning of paper documents by mail (as normally conducted) can reveal a pattern of nefarious activities. The return postage can be audited by comparing a total number of mail-in paper documents and the pre-paid envelops returned. Large discrepancies in these number can indicate fraud.

To search for paper document irregularities, an audit for "mail-in paper documents received and counted" against the mailed paper documents. A numeric check of the mailed paper documents can be compared to the number of paper documents returned by the Post Office, the paper documents received over the counter, the paper document received from drop sites, paper document forward to different entities (e.g., counties, states, etc.), paper documents returned as undeliverable, etc. As a non-limiting example, paper documents that are mail-in ballots includes: (1) for all ballots that fall into the category of "signature and address match", the corresponding envelope is recorded as "returned" and data entry is completed. The number of envelopes in this category is recorded on a data entry log on a daily basis. (2) A number of paper documents should balance to a number of envelopes stored and flagged as "ready to open and process". (3) If a significant influx of ballots did not get logged in at the United States Post Office level, then this would be a significant indicator that such ballots circumvented the United States Post Office logging process and came into the back door nefariously. (4) Logging is required at all drop off locations. If a paper document is nefariously rushed into the system, the log in process would be skipped and the paper document would be directly transferred to the voting system processing.

The audit would detect a discrepancy trail based on the paper document showing up in the voting system processing without log-in processing.

QR codes, if deployed, can leave an audit trail. The QR codes, when read by the kinematic assessment machine 100, can show the data signatures of the QR codes, which are a widely used, open format for encoding data in a resilient two-dimensional barcode. Because it is an open format, there are numerous applications, many of them free, that are publicly available for scanning and decoding a QR code, so that the contents may be read. A voter could, therefore, use any QR code reader to decode the vote selections QR code on their paper document and verify that the selections encoded in the QR code are identical to the selections printed on the paper document.

Figure 3A:
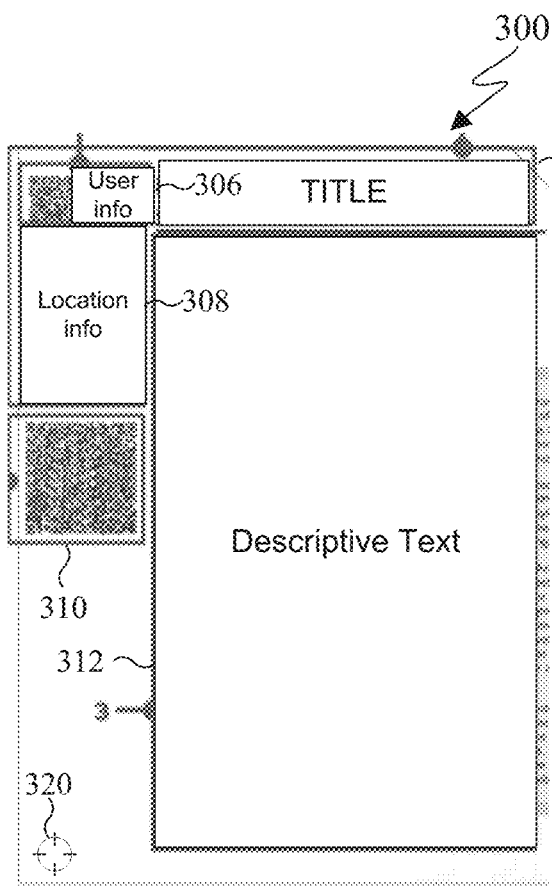
FIGS. 3A and 3B illustrate a front side and back side of a paper document in accordance with this disclosure

As an example, when the QR code printed on the paper document shown in FIG. 3A is scanned by a QR code reader, the following data can appear.

VER:A.SEL:4N/4E/H/J/3C/#k/35/45/4S/45/3Z/4A/X/3Q/3S/3U/3W/3Y/N/Y
BMD:0000046.SIG:4R57D5C44QKEJRS3OBF33P-LOZ6U9THBR74NTA1VVH
K09E6NFDH3DWXPY8Q9ZF6VD0LAQ1E6IY6AG-QC1S4TG095N8NEN3AFOET12

Cross Checking the "data fields" and looking for systematic patterns is what will reveal the election fraud. The codes (in most systems) break down in a sequence similar to the sequence shown above in relation to the information in TABLE 1. This data is stored as a string of text organized in a key-value pair format designed for the ballot marking device (BMD) or the kinematic assessment machine 100. Table 1 provides a breakdown and description of the key-value pairs in the example above.

TABLE 1

Description of key-value pairs encoded in the vote selections QR code

| Key | Value | Description |
| --- | --- | --- |
| VER | A | Version of the VSAP key-value format |
| SEL | 4N/4E/H/J/3C/3K/35/4S/3Z/4A/X/3Q/3S/3U/3W/3Y/N/Y | The vote selection IDs listed in the same order as those printed on the paper document |
| BMD | 0000046 | Device ID of the BMDS |
| SIG | 4R57D5C44QKEJRS3OZ6U9TH BR74NTA1VVHK09E6NFDH4DWXPY8Q9ZF6VD 0LAQ1E6IY6AGQCIS4TG095N8NEN3AFOET12 | The digital signature applied to the data in the paper document activation and vote selection QR codes by the BMD security module. |

To audit the QR code and verify that the correct vote selections identifications are being transmitted to the tally system, the kinematic assessment machine 100 compares the SEL key values in the QR code with the vote selection identifications printed on the paper document.

The kinematic assessment machine 100 can also identify batch feeding patterns. The kinematic assessment machine 100 can audit, for batch feeding, information received at other devices and collected in a central database. Tally systems do not possess functionality to identify non-unique QR codes. A QR codes (or any code for that matter) is not protected against "photocopying" and a photocopy is just as readable as the original. This means any copied code can just be fed into the tally machine repeatedly. However, the repetition of a QR CODE combined with the date/time stamps can identify these fraudulent paper documents.

The kinematic assessment machine 100 can identify batch feeding in both the machine and the remote tally systems. The kinematic assessment machine 100 identifies batch feeding is through identifying a same code used more than once in the system (could be attributed to accident). However, the kinematic assessment machine 100 identifying the code has been used more than once in the system with repeated sequential date time stamps shows malicious intent.

TABLE 2

Automated Timestamp Parsing
Automated Timestamp Parsing

| Timestamp format | Example |
| --- | --- |
| yyyy-MM-dd*HH:mm:ss:SSS | 2017-10-30*02:47:33:899 |
| yyyy-MM-dd*HH:mm:ss | 2017-07-04*13:23:55 |
| yyyy-MM-dd HH:mm:ss,SSS ZZZ | 11-02-11 16:47:35,985 +0000 |
| yyyy-MM-dd HH:mm:ss,SSS | 10-06-26 02:31:29,573 |

In the instance of batch feeding, the kinematic assessment machine 100 can identify a systematic "rhythm" to the data. If one or more of the same codes shows up in a sequenced nature (insertion one after another in succession), then the kinematic assessment machine 100 can determine misuse and malicious intent to change the results. The tally machines can log each item of a transaction is recorded and time stamped, and/or date stamped. Subsequent stamps or codes added by a tally machine can help show both fraud and intent.

Human nature in creation of "illegal ballots" can create a specified number of fraudulent candidate ballots to swing an election for a candidate. In certain embodiments, a reduced number of fraudulent opposing ballots are created in an attempt to hide the fraud by showing at least some votes for the challenger of the candidate. The specified number of ballots could take into consideration the reduced number of fraudulent opposing ballots for the challenger. The reduced number of fraudulent opposing ballots can be sporadically intermingled with the specified number of fraudulent candidate ballots. In certain embodiments, legitimate opposing ballots can be sporadically intermingled with the specified number of fraudulent candidate ballots. While these circumstances would be difficult to deduct on the voting result alone, the pattern of how the ballots are introduced into the system reveal the fraud. For example, the opposing ballots could be fed at regular or irregular intervals with the fraudulent candidate ballots.

The QR code 310 can be located on a front side of the paper document 104. The kinematic assessment machine 100 can be programmed for printing the QR code 310 in a position, font, etc. The printing of the QR code 310 in the kinematic assessment machine 100 can also be used to for identifying and authenticating the paper document 104. For example, the kinematic assessment machine 100 can read the QR code 310 of the paper document 104 and compare the QR code 310 to one or more of the other aspects of the paper document 104. The kinematic assessment machine 100 can assess the location, the size, the shape, the font, or any other aspect of the QR code 310 when authenticating paper document 104.

In certain embodiments, the QR code 310 includes an outline around an area for the QR code 310. The edges of the outline can be compared to an edge of the paper document 104 or to other components of the paper document 104. In some embodiments, the outline or the QR code 310 can be compared to one of the components on the back side 302 of the paper document 104.

A location of the QR code 310 or shape of the area of the QR code 310 can also be used by the kinematic assessment machine 100 to assess the alignment of the paper document 104. For example, the area of the QR code 310 can be identified and measured from the borders of the paper document 104 to have the alignment of the paper document 104 assessed by the kinematic assessment machine 100.

While illustrated on a front side 300 of the paper document 104, the QR code 310 could alternatively or dually be located on the back side 302 of the paper document 104. The kinematic assessment machine 100 can determine that the QR code 310 is misaligned based on comparing a location of the QR code 310 to an edge of the paper document 104. The kinematic assessment machine 100 can also determine that the QR code 310 is misaligned based on comparing the QR code 310 to other components on the front side 300 of the paper document 104. For instance, if a border of the QR code 310 is not parallel to an edge of the paper document 104, the kinematic assessment machine 100 can determine that the printing of the QR code 310 or the printing of the front side 300 is not aligned with the paper.

In certain embodiments, the QR code 310 on either the front side 300 or the back side 302 can be compared to a component of the paper document 104 on an opposite side of the paper document 104. For instance, the QR code 310 can be aligned on the front side 300 and the back side 302 of the paper document 104. The kinematic assessment machine 100 can determine that the paper document 104 is misaligned based on the distance one edge from a center of the QR code 310 on the front side 300 to a center of the QR code 310 on the back side 302. The kinematic assessment machine 100 can determine that the paper document 104 is misaligned based on the border of the QR code 310 not aligning through the paper document 104 with a border on an opposite side of the paper document 104.

The descriptive text 312 can be printed on either side of the paper document 104. The descriptive text 312 can include general descriptions of the paper document 104, accompanying documents, instructions, etc. The descriptive text 312 can also include identification information related to different alignment or authentication designs of the paper document 104. The descriptive text 312 can be located on the front side of the paper document 104. The kinematic assessment machine 100 can be programmed for printing the descriptive text 312 in a position, font, etc. The printing of the descriptive text 312 in the kinematic assessment machine 100 can also be used to for identifying and authenticating the paper document 104. For example, the kinematic assessment machine 100 can read the descriptive text 312 of the paper document 104 and compare the descriptive text 312 to one or more of the other aspects of the paper document 104. The kinematic assessment machine 100 can assess the location, the size, the shape, the font, or any other aspect of the descriptive text 312 when authenticating paper document 104.

In certain embodiments, the descriptive text 312 includes an outline around an area for the descriptive text 312. The edges of the outline can be compared to an edge of the paper document 104 or to other components of the paper document 104. In some embodiments, the outline or the descriptive text 312 can be compared to one of the components on the back side 302 of the paper document 104. A location of the descriptive text 312 or shape of the area of the descriptive text 312 can also be used by the kinematic assessment machine 100 to assess the alignment of the paper document 104. For example, the area of the descriptive text 312 can be identified and measured from the borders of the paper document 104 to have the alignment of the paper document 104 assessed by the kinematic assessment machine 100.

While illustrated on a front side 300 of the paper document 104, the descriptive text 312 could alternatively or dually be located on the back side 302 of the paper document 104. The kinematic assessment machine 100 can determine that the descriptive text 312 is misaligned based on comparing a location of the descriptive text 312 to an edge of the paper document 104. The kinematic assessment machine 100 can also determine that the descriptive text 312 is misaligned based on comparing the descriptive text 312 to other components on the front side 300 of the paper document 104. For instance, if a border of the descriptive text 312 is not parallel to an edge of the paper document 104, the kinematic assessment machine 100 can determine that the printing of the descriptive text 312 or the printing of the front side 300 is not aligned with the paper.

In certain embodiments, the descriptive text 312 on either the front side 300 or the back side 302 can be compared to a component of the paper document 104 on an opposite side of the paper document 104. For instance, the descriptive text 312 can be aligned on the front side 300 and the back side 302 of the paper document 104. The kinematic assessment machine 100 can determine that the paper document 104 is misaligned based on the distance one edge from a center of the descriptive text 312 on the front side 300 to a center of the descriptive text 312 on the back side 302. The kinematic assessment machine 100 can determine that the paper document 104 is misaligned based on the border of the descriptive text 312 not aligning through the paper document 104 with a border on an opposite side of the paper document 104.

The response bubble area 314 is designed for a user to enter information related to a test, a survey, a vote, etc. The bubble area 314 can include any number of rows of bubbles and any number of bubbles in each row. Each bubble can include an identifier, such as a letter in a sequence of the bubbles for a row. A bubble in the bubble area 314 identifies a selection from a user that corresponds to an answer for a question or selection from a list of items. In order for a bubble to be read on the sheet, a specific amount of the bubble is filled in. Discussed in greater detail below, the marking on the bubble can be distinguished between a printed bubble and a bubble filled by a user.

The response bubble area 314 can be located on the back side 302 of the paper document 104. The kinematic assessment machine 100 can be programmed for printing the response bubble area 314 in a position, font, etc. The printing of the response bubble area 314 in the kinematic assessment machine 100 can also be used to for identifying and authenticating the paper document 104. For example, the kinematic assessment machine 100 can read the response bubble area 314 of the paper document 104 and compare the bubble area 314 to one or more of the other aspects of the paper document 104. The kinematic assessment machine 100 can assess the location, the size, the shape, the font, or any other aspect of the response bubble area 314 when authenticating paper document 104.

In certain embodiments, the response bubble area 314 includes an outline around an area for the response bubble area 314. The edges of the outline can be compared to an edge of the paper document 104 or to other components of the paper document 104. In some embodiments, the outline or the response bubble area 314 can be compared to one of the components on the back side 302 of the paper document 104. A location of the response bubble area 314 or shape of the area of the response bubble area 314 can also be used by the kinematic assessment machine 100 to assess the alignment of the paper document 104. For example, the area of the response bubble area 314 can be identified and measured from the borders of the paper document 104 to have the alignment of the paper document 104 assessed by the kinematic assessment machine 100.

While illustrated on a back side 302 of the paper document 104, the response bubble area 314 could alternatively or dually be located on the front side 300 of the paper document 104. The kinematic assessment machine 100 can determine that the response bubble area 314 is misaligned based on comparing a location of the response bubble area 314 to an edge of the paper document 104. The kinematic assessment machine 100 can also determine that the response bubble area 314 is misaligned based on comparing the response bubble area 314 to other components on the front side 300 of the paper document 104. For instance, if a border of the response bubble area 314 is not parallel to an edge of the paper document 104, the kinematic assessment machine 100 can determine that the printing of the response bubble area 314 or the printing of the front side 300 is not aligned with the paper.

In certain embodiments, the response bubble area 314 on either the front side 300 or the back side 302 can be compared to a component of the paper document 104 on an opposite side of the paper document 104. For instance, the response bubble area 314 can be aligned on the front side 300 and the back side 302 of the paper document 104. The kinematic assessment machine 100 can determine that the paper document 104 is misaligned based on the distance one edge from a center of the response bubble area 314 on the front side 300 to a center of the response bubble area 314 on the back side 302. The kinematic assessment machine 100 can determine that the paper document 104 is misaligned based on the border of the response bubble area 314 not aligning through the paper document 104 with a border on an opposite side of the paper document 104.

In certain embodiments, a specific bubble can be identified to match with a specific component on an opposite side of the paper document 104. For example, the kinematic assessment machine 100 can print the rows of bubbles in a manner that when light is shined through the paper document 104, a specific set of rows is covered by the QR code 310 on the opposite side. In another embodiment, the QR code 310 can be designed in a manner that a specific bubble or set of bubble can be seen through the paper document 104. For example, when "looking through" the paper document 104, the kinematic assessment machine 100 can identify that the "C" bubble on the twelve row, the "A" bubble on the thirteenth row, and the "B" and "E" bubbles on the fourteenth row are identified through the QR code. This procedure can authenticate the paper document. In this case, when portions of the "A," "B" and "E" bubbles are visible but not the "C" bubble, the kinematic assessment machine 100 can determine that the printing of the paper document 104 is not aligned.

The accompanying items information 316 can include information identifying a form, such as a questionnaire or test, an envelope for mailing the paper document 104, etc. The accompany items information 316 can be printed by the kinematic assessment machine 100 or filled in by the user. In certain embodiments, the accompany items are randomized or personalized to reduce opportunities of fraud. While every survey may include the same general questions or polls with the same answers, the order of the questions and the order of the selections may be randomized or have a set number of alternates. In order to identify the correct order of the questions and answers, the user can select the appropriate accompanying items information matching the identification found on the accompanying item.

In certain embodiments, the kinematic assessment machine 100 can print envelopes or other types of documents related to the paper documents. For instance, a return envelope can be printed along with the paper document 102. The associated envelopes can have information printed on either the outside or the inside that links the associated envelope to a specific the paper document. The information could include text, symbols, barcodes, UPC codes, QR code, etc. The same information can be printed on both the paper documents and the corresponding envelopes. In certain embodiments, the information can be different but applied to an algorithm to confirm the matching state of the paper document and the envelope.

The kinematic assessment machine 100 can track the number of envelopes printed each day and balanced with the number of user records flagged in the request file that were issued mail paper documents. The balancing can be rectified for each specified time period, for instance, daily, weekly, etc. The list of users in the request file can be printed each time that the balance is rectified as a part of an audit trail. Each time period that envelopes are printed, a master list of names in a request list is printed and balanced to a number of envelopes printed, inserted, and delivered. The audit trail will also provide the necessary tool for use in tracking and verifying a printed paper document inventory.

In certain embodiments, the accompany items information 316 can be identification information for packaging with the paper document 104. For example, the kinematic assessment machine 100 can print a return envelope with information corresponding to the accompany items information 316 printed on the paper document 104. When the paper document 104 is returned with the accompany item, the kinematic assessment machine 100 can compare the accompany items information 316 with the information on the accompany item(s) to determine authenticity of the paper document 104.

The kinematic assessment machine 100 can code each paper document or associated envelope for "return postage." This will ensure that the paper documents were provided through the mail. In certain embodiments, a drop off point can be used for the paper documents. However, even the paper documents received at drop off points would have some form of transportation to a sorting facility. The returning of paper documents by mail can reveal a pattern of nefarious activities. This is audited by comparing the total number of mail-in paper documents mailed and the "prepaid" returned back in account. Large discrepancies can point to fraud.

The kinematic assessment machine 100 can search for "paper document irregularities" in an audit of the "mailed in paper documents received and counted" against the mailed paper documents. The kinematic assessment machine 100 can check the request list against the following audit factors. The kinematic assessment machine 100 can identify paper documents returned by the Post Office, paper documents received over the counter, paper documents received from drop sites, paper documents forwarded to other counties, paper documents returned undeliverable, etc.

In certain embodiments, the kinematic assessment machine 100 can check for regulatory issues. For example, in voting ballot collection the following is the standard law regarding the mail in ballots. For all paper documents that fall into the category of "signature and address match," the envelope is recorded as "returned" and data entry is completed. The number of envelopes in this category is recorded on a data entry log on a daily basis. The kinematic assessment machine 100 can store and analyze the data entry log compared to the paper documents received. This number should balance to the number of envelopes stored and flagged as "ready to open and process." If a significant influx of paper documents did not get logged in at the USPO level, then the kinematic assessment machine 100 could determine that such paper documents circumvented the USPO logging process and came into the back door nefariously.

In certain embodiments, the paper documents can be received at drop off locations, which also requiring logging of the received paper documents. If nefariously rushed into the system, the logging process is skipped and any processed paper documents would leave a discrepancy trail. The kinematic assessment machine 100 could use these logs when authenticating paper documents.

The accompanying items information 316 can be located on the back side 302 of the paper document 104. The kinematic assessment machine 100 can be programmed for printing the accompanying items information 316 in a position, font, etc. The printing of the accompanying items information 316 in the kinematic assessment machine 100 can also be used to for identifying and authenticating the paper document 104. For example, the kinematic assessment machine 100 can read the accompanying items information 316 of the paper document 104 and compare the accompanying items information 316 to one or more of the other aspects of the paper document 104. The kinematic assessment machine 100 can assess the location, the size, the shape, the font, or any other aspect of the accompanying items information 316 when authenticating paper document 104. For example, the accompanying items information 316 can be printed in a different, such as smaller, font from some of the user information 306 and/or the bubble area 322.

In certain embodiments, the accompanying items information 316 includes an outline around an area for the envelope information 316. The edges of the outline can be compared to an edge of the paper document 104 or to other components of the paper document 104. In some embodiments, the outline or the accompanying items information 316 can be compared to one of the components on the back side 302 of the paper document 104. For example, the left side of the accompanying item information 316 can align with a left side of the user info 306 and a right side of the accompanying items information 316 can align with a right side of a signature block 318. As another example, the top side of the accompanying items information 316 can be spaced apart from bottom side of the title block 306 and the signature block 318 while the bottom side of the accompanying items information 316 can be offset from a bottom side of the bubble area 314.

A location of the accompanying items information 316 or shape of the area of the accompanying items information 316 can also be used by the kinematic assessment machine 100 to assess the alignment of the paper document 104. For example, the area of the accompanying items information 316 can be identified and measured from the borders of the paper document 104 to have the alignment of the paper document 104 assessed by the kinematic assessment machine 100.

While illustrated on a back side 302 of the paper document 104, the accompanying items information 316 could alternatively or dually be located on the front side 300 of the paper document 104. The kinematic assessment machine 100 can determine that the accompanying items information 316 is misaligned based on comparing a location of the accompanying items information 316 to an edge of the paper document 104. The kinematic assessment machine 100 can also determine that the accompanying items information 316 is misaligned based on comparing the accompanying items information 316 to other components on the front side 300 of the paper document 104. For instance, if a border of the accompanying items information 316 is not parallel to an edge of the paper document 104, the kinematic assessment machine 100 can determine that the printing of the accompanying items information 316 or the printing of the front side 300 is not aligned with the paper.

In certain embodiments, the accompanying items information 316 on either the front side 300 or the back side 302 can be compared to a component of the paper document 104 on an opposite side of the paper document 104. For instance, multiple accompanying items information 316 can be aligned on the front side 300 and the back side 302 of the paper document 104. The kinematic assessment machine 100 can determine that the paper document 104 is misaligned based on the distance one edge from a center of the accompanying items information 316 on the front side 300 to a center of the accompanying items information 316 on the back side 302. The kinematic assessment machine 100 can determine that the paper document 104 is misaligned based on the border of the accompanying items information 316 not aligning through the paper document 104 with a border on an opposite side of the paper document 104.

In certain embodiments, the information in the accompanying items information 316 can be aligned with items from the descriptive text 308 in a "see through" manner. For example, the descriptive text 312 can include watermarks or other distinguishing characteristics that combine in a "see through" manner with the accompanying items information. For example, the descriptive text can include an equal number of watermark rectangles corresponding to an amount fields in the accompanying items information. The watermarks can provide an outline for the entry fields in the accompanying item information 316 in a "see through" manner.

The signature area 318 provides a signature line for a user of the paper document 104 to sign and personally authenticate that answers were completed by the authorized user on a paper document 104. The signature area 318 can be compared to a signature on an accompanying document, from a database, etc.

The signature area 318 can be located on the back side 302 of the paper document 104. The kinematic assessment machine 100 can be programmed for printing the signature area 318 in a position, font, etc. The printing of the signature area 318 in the kinematic assessment machine 100 can also be used to for identifying and authenticating the paper document 104. For example, the kinematic assessment machine 100 can read the signature area 318 of the paper document 104 and compare the signature area 318 to one or more of the other aspects of the paper document 104. The kinematic assessment machine 100 can assess the location, the size, the shape, the font, or any other aspect of the signature area 318 when authenticating paper document 104.

In certain embodiments, the signature area 318 includes an outline around an area for the signature area 318. The edges of the outline can be compared to an edge of the paper document 104 or to other components of the paper document 104. In some embodiments, the outline or the signature area 318 can be compared to one of the components on the back side 302 of the paper document 104. A location of the signature area 318 or shape of the area of the signature area 318 can also be used by the kinematic assessment machine 100 to assess the alignment of the paper document 104. For example, the area of the signature area 318 can be identified and measured from the borders of the paper document 104 to have the alignment of the paper document 104 assessed by the kinematic assessment machine 100.

While illustrated on a back side 302 of the paper document 104, the signature area 318 could alternatively or dually be located on the front side 300 of the paper document 104. The kinematic assessment machine 100 can determine that the signature area 318 is misaligned based on comparing a location of the signature area 318 to an edge of the paper document 104. The kinematic assessment machine 100 can also determine that the signature area 318 is misaligned based on comparing the signature area 318 to other components on the front side 300 of the paper document 104. For instance, if a border of the signature area 318 is not parallel to an edge of the paper document 104, the kinematic assessment machine 100 can determine that the printing of the signature area 318 or the printing of the front side 300 is not aligned with the paper.

In certain embodiments, the signature area 318 on either the front side 300 or the back side 302 can be compared to a component of the paper document 104 on an opposite side of the paper document 104. For instance, the signature area 318 can be aligned on the front side 300 and the back side 302 of the paper document 104. The kinematic assessment machine 100 can determine that the paper document 104 is misaligned based on the distance one edge from a center of the signature area 318 on the front side 300 to a center of the signature area 318 on the back side 302. The kinematic assessment machine 100 can determine that the paper document 104 is misaligned based on the border of the signature area 318 not aligning through the paper document 104 with a border on an opposite side of the paper document 104.

In certain embodiments, the paper document 104 can be manufactured to have a different thickness for the signature area 318 in order for blocking "see through" of the signature area from the kinematic assessment machine 100. When the kinematic assessment machine 100 performs a "see through" procedure, the information can be stored. As a signature should be unique for every user, attempting to include alignment features for "see through" procedures would be difficult. As the signatures can be read/stored by a typical imaging of each side of the paper document, the actual signature may not be necessary for a "see through" image based on aligning or authenticating the document itself. When the signature is visible in the "see through" process, the kinematic assessment machine 100 can determine that printing of the paper document 104 is not in alignment with the paper itself and also the opposite side.

In certain embodiments, "see through" items can be included in a portion of the signature area 318 that do not correspond to portions of the paper product manufactured to obfuscate from the "see through" procedure. For example, a watermark could be included in the signature area 318 that corresponds to an indicator in the title area 304 or the descriptive text 312. Portion of the signature that are visible proximate to the watermark or other indication would not cause the kinematic assessment machine 100 to determine that the printing of the paper product 104 is not in alignment.

The discussion of obfuscating portions of the signature area 318 can be extended to other portions of the paper product 104 for authentication and alignment. For example, the paper product 104 can be manufactured with specific designs of obfuscating thickness to correspond to the different components of the paper document 104 and the items within the paper document 104. For example, the user information 306 can also include the manufacturing thickness to obfuscate the information. In certain embodiments, the paper can be manufactured with embedded information that is only visible in a "see through" process. This embedded information can be used for alignment for the components printed on the paper document 104. Information embedded in the paper can aid in situations where the "see through" process determines that the printing is aligned on both side but the orientation is similarly incorrect on both side of the paper product 104.

Figure 3B:
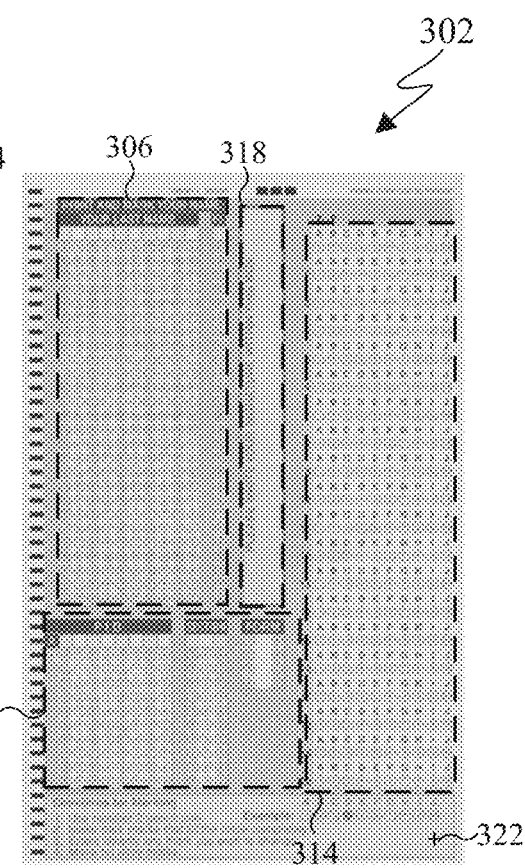

The front alignment marker 320 and the back alignment marker 322 can be printed on alternate sides of the paper product specifically for the purpose of "see through" alignment. The front alignment marker 320 and the back alignment marker 322 could any shape or design meant to jointly attribute alignment of the printing. In certain embodiments, the front alignment marker 320 and the back alignment marker 322 are the same but reversed in a manner that they align when the kinematic assessment machine 100 performs a "see through" process. In certain embodiments, the front alignment marker 320 and the back alignment marker 322 are different, such as illustrated in FIGS. 3A and 3B on the front side 300 and back side 302 of the paper product 104.

In the illustrated embodiment, the front alignment marker 320 is an outside of a reticle and the back alignment marker 322 is an inside of a reticle. When viewed in a "see through" process, the inside and outside of the reticle should align. The outside reticle of the front alignment marker 320 includes a number of hash marks on a circle. The hash marks typically are at the poles of the circle. The inside reticle of the back alignment marker 322 is designed as a vertical cross with equal vertical and horizontal portions, although this is a non-limiting example. During the "see through" process, the kinematic assessment machine 100 can determine that the front alignment marker 320 and the back alignment marker 322 are aligned when the hash marks are aligned with the corresponding portions of the vertical cross. When the printing on one side of the paper product 104 is shifted from the other side of the paper product 104, at least one of the hash marks will not align with the vertical cross. When the printing on one side of the paper product 104 is rotated from the other side of the paper product, the hash marks will be rotated from the vertical cross with exceptions for when the printing is extremely rotated at 90, 180, and 270 degrees. In these situations, a hash mark directed to a top of the page and a portion of the vertical cross directed to a top of the page can be altered from the other direction. For example, the top hash mark and the top of the vertical cross can be a different length, width, etc., from the other directions. The kinematic assessment machine 100 could identify when the top hash mark or the top portion of the vertical cross are not properly aligned. As an additional feature, the paper can be manufactured with an embedded mark that should also align with the top hash mark and the top portion of the vertical cross.

The locations of the front alignment marker 320 and the back alignment marker 322 should coincide when the paper document is printed in order for the front alignment marker 320 and the back alignment marker 322 to properly align during the "see through" alignment process. While the front alignment marker 320 and the back alignment marker 322 need to align, the location on the actual document can vary. For example, the front alignment marker 320 is illustrated in a bottom left corner on the front side 300 of the paper product 104 but can be located anywhere on the front side 300 of the paper product 104. In certain embodiments, the front alignment marker 320 could be printed within one of the components of the paper product 104. For example, the front alignment marker 320 could be printed within the descriptive text area 312 and the back alignment marker 320 could then be printed in a portion of the accompanying document area 312 that does not include a field.

Although FIG. 3 illustrate a paper document 300, various changes may be made to FIG. 3. For example, the sizes, shapes, and dimensions of the voting paper document 300 and its individual components can vary as needed or desired. Also, the number and placement of various components of the voting paper document 300 can vary as needed or desired. In addition, the paper document 300 may be used in any other suitable voting process and is not limited to the specific processes described above. The postal paper document 104 shown in FIG. 1 is an example of a paper document 300.

Figure 4A:
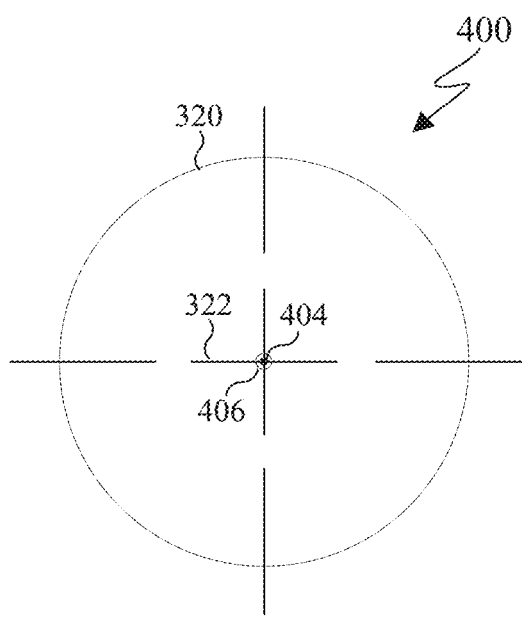
FIGS. 4A and 4B illustrate exemplary alignment indicia in accordance with this disclosure.
Figure 4B:
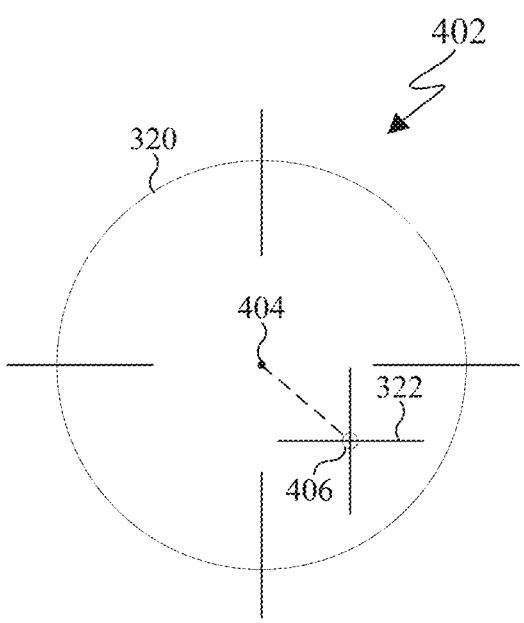

FIGS. 4A and 4B illustrate exemplary alignment indicia in accordance with this disclosure. In particular, FIG. 4A illustrates that the front alignment marker 320 and the back alignment marker 322 are aligned markers 400, and FIG. 4B illustrates that the front alignment marker 320 and the back alignment marker 322 are misaligned marker 402. The embodiments of the aligned markers 400 and misaligned markers 402 illustrated in FIGS. 4A and 4B are for illustration only. FIGS. 4A and 4B do not limit the scope of this disclosure to any particular implementation of a paper document.

As shown in FIG. 4A, the aligned markers 400 from a "see through" procedure show that the front alignment marker 320 and the back alignment marker 322 are aligned. A "see through" procedure involves the kinematic assessment machine 100 capturing an image from a front side 300 or a back side 302 of the paper document 104 with a printing on the opposite side showing through that the imaging sensor can capture the printing overlapped. In certain embodiments, the kinematic assessment machine 100 can project a light from a light source from an opposite side of the paper document from the imaging sensor. The light then travels through the paper document to the imaging sensor.

Although the front alignment marker 320 is illustrated as a reticle and the back alignment marker 322 is illustrated as a vertical cross, the front alignment marker 320 and the back alignment marker 322 can be any complimentary or aligned shapes. For instance, the front alignment marker 320 can be a circle and the back alignment marker 322 could be a square. The front alignment marker 320 and the back alignment marker 322 could align with the circle inside the square and the circle would touch the center of each edge of the square. Alternatively, the square could be inside the circle and the four corners of the square would contact the circle.

The front alignment marker 320 has a center point 404 and the back alignment marker 322 has a center point 406. The center points 404 and 406 could be inherent or they could be explicit. In other words, the center points 404 and 406 could be marked or have a unique indication. For example, the center point 404 is illustrated as a solid circle and the center point 406 is illustrated as a hollow circle. The center points 404 and 406 could be used to determine alignment based on the center point 404 filling in the hollow portion of the center point 406. As a note for FIG. 4A, the center points 404 and 406 do not show the center point 404 filling center point 406 in order to differentiate the components. In practice, the center points 404 and 406 could be a single solid circle for the aligned markers 400.

As an alternative, either the front and back markers 320 and 322 or the center points 404 and 406 could be any shape for the respective interior indicator and any other outline of a shape with a hollow interior. The interior indicator could be designed to fit wholly within the outline of the exterior shape. The kinematic assessment system 100 could determine that the printing on the front side 300 and the back side 302 are misaligned based on the interior shape not being wholly within the outline of the exterior shape. The tolerance of the alignment can be incorporated by an amount of space between the interior shape and the outline of the exterior shape.

The thickness of the circle for the center point 406 can provide a range for tolerance of the alignment of the printing. For example, if the diameters of both center points are approximately the same, then the thickness of the hollow circle could be designed based on manufacturing tolerances. Herein, "the same dimension" can be defined herein as "within manufacturing tolerances of the intended dimension". For example, if the accuracy of the printer is 0.0003 inches, then the thickness of the hollow circle could be 0.0006 inches or greater.

Another example of a light source would be to form a cover, for kinematic assessment machine 100 over the scanning area of the imaging sensor, made of electrochromic glass, such as smart glass. The kinematic assessment machine 100 could control the opaqueness of the electrochromic glass by applying a small voltage to use the imaging sensor for a single side and not apply a voltage for the "see through" process. In embodiments where the alignment markers are known to be located within a small area of the paper document, the cover could have a corresponding portion of the imaging cover formed of smart glass.

In certain embodiments, the "see through" process can be a virtual process with precisely aligned imaging sensors on opposite side. At least one imaging sensor can be positioned with the body of the kinematic assessment machine 100 to align with at least one imaging sensor positioned in the imaging cover. The image sensors can be positioned and oriented to have substantially parallel optical axis in opposite direction.

In certain embodiments, an array of imaging sensors could be used one on or more side of the paper document 104. The array of imaging sensors could be arranged in a pattern to capture an entire "see through" paper document. In certain embodiments, the sensors in the array of imaging sensors could be located proximate to different alignment markers in order to efficiently capture each alignment marker. The alignment of the front alignment marker 320 and the back alignment marker 322 can be defined in numerous ways with the symbols.

Figure 5:
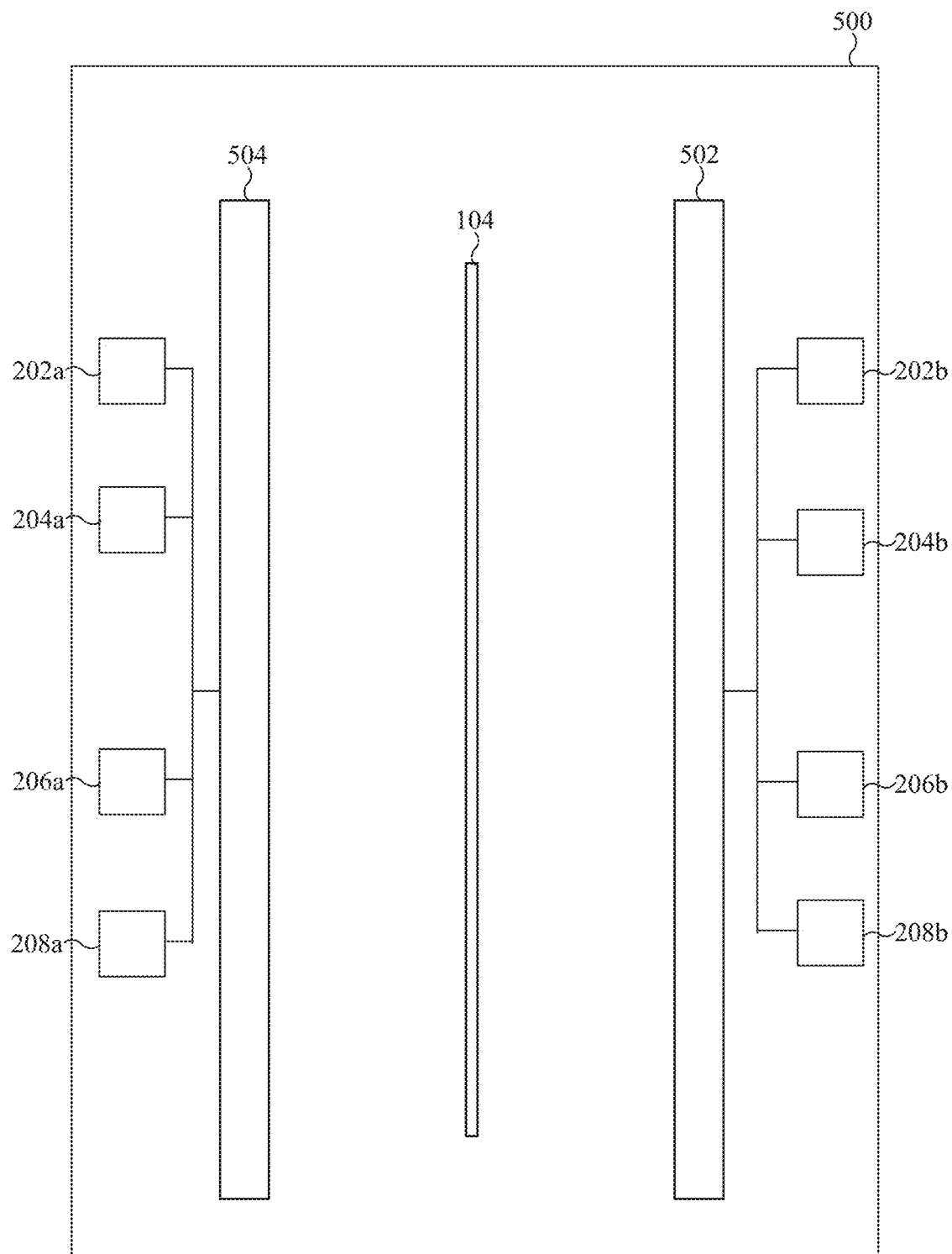
FIG. 5 illustrates an exemplary "see through" apparatus with a first and second scanning elements for a paper document authenticator in accordance with this disclosure.

FIG. 5 illustrates an exemplary "see through" apparatus 500 with a first scanning element 502 and second scanning element 504 for a paper document authenticator in accordance with this disclosure. The embodiment of the "see through" apparatus 500 illustrated in FIG. 5 is for illustration only. The "see through" apparatus 500 can be implemented with the kinematic assessment machine 100 or the paper document authenticator 402 shown in FIG. 1. FIG. 5 does not limit the scope of this disclosure to any particular implementation of an electronic device.

As shown in FIG. 5, a "see through" apparatus 500 can be used to identify kinematic defects in addition to alignment marks. The "see through" apparatus 500 includes a first scanning element 502 and a second scanning element 504. A paper document 104 can be inserted between the first scanning element 502 and the second scanning element 504. The paper document can be stationary or moving through the apparatus 500 during imaging operations. Each of the first scanning element 502 and the second scanning element 504 can include one or more of the sensors 214, which can include one or more cameras 216 (optical sensor), one or more infrared sensors 218, one or more contact image sensors 220, one or more charge-coupled device 222, or one or more of any other suitable imaging sensors.

The "see through" apparatus 500 can also include one or more processors 202, one or more storage devices 204, one or more communications units 206, and one or more I/O units 208. The first scanning element 502 can be operatively coupled to one or more first processors 202a, one or more first storage devices 204a, one or more first communications units 206a, and one or more first I/O units 208a. The second scanning element 504 can be operatively coupled to one or more second processors 202a, one or more second storage devices 204a, one or more second communications units 206a, and one or more second I/O units 208a.

The processors 202 can control illumination and imaging operations of the first scanning element 502 and the second scanning element 504. In certain embodiments, a first processor 202a can operate the first scanning element 502 separately from a second processor 202b operating the second scanning element 504. The processors 202a and 202b can communicate using a first communication unit 206a and a second communication unit 206b. The processors 202a and 202b can store the images captured by the first scanning element 502 and the second scanning element 504 in a first memory 204a and a second memory 204b. The first memory 204a and the second memory 204b can include instructions to cause the processors 202 to control the first scanning element 502 and the second scanning element 504. The first scanning element 502 and the second scanning element 504 can be receive inputs and provide outputs through a single I/O unit 208 or the first scanning element can receive inputs and provide output from a first I/O unit 208a separate from a second I/O unit 208b.

Each of the first scanning element 502 and the second scanning element 504 can include a light or other illumination component. As the paper document 104 is inserted between the first scanning element 502 and the second scanning element 504, the first scanning element 502 can operate the light or other illumination component while the second scanning element 504 captures one or more images of the paper document 104. Because the light is provided on an opposite side of the paper document from the scanning element, any ink on either side of the paper document 104 is captured by the respective scanning element. Once the second scanning element 504 has completed imaging from a respective side of the paper document 104, the first scanning element can perform a scanning operation while the second scanning element 504 performs an illumination operation.

For a paper document moving through the "see through" apparatus 500, the paper document 104 can be moved a specified amount per imaging operation of both the first scanning element 502 and the second scanning element 504. In certain embodiments, the paper document 104 can be continuously moved through the "see through" apparatus 500. The first scanning element 502 and second scanning element 504 can alternately capture a series of images for each side of the paper document 104 while traveling through the apparatus 500. In certain embodiments, the first scanning element 502 and the second scanning element 504 can be provided capture one or more specific areas of the paper document 104. In certain embodiments, the "see through" image is unique based on a side of the paper document 104.

Although FIG. 5 illustrate a "see through" apparatus 500, various changes may be made to FIG. 5. For example, the sizes, shapes, and dimensions of the "see through" apparatus 500 and its individual components can vary as needed or desired. Also, the number and placement of various components of the "see through" apparatus 500 can vary as needed or desired. In addition, the "see through" apparatus 500 may be used in any other suitable imaging process and is not limited to the specific processes described above.

Figure 6:
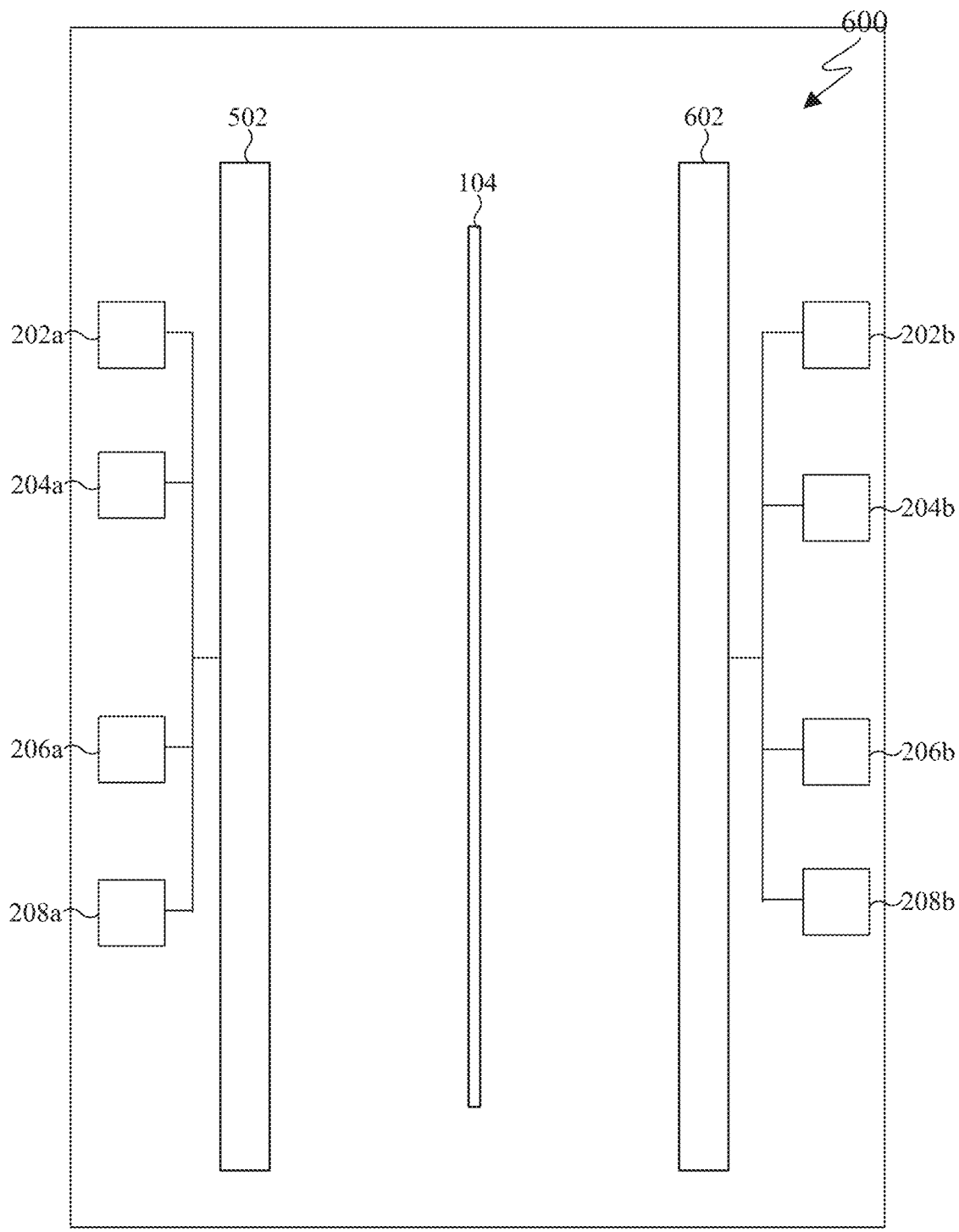
FIG. 6 illustrates an exemplary scanning element and illumination element for a paper document authenticator in accordance with this disclosure.

FIG. 6 illustrates an exemplary "see through" apparatus 600 with a first and second scanning elements for a paper document authenticator in accordance with this disclosure. The embodiment of the "see through" apparatus 600 illustrated in FIG. 6 is for illustration only. The "see through" apparatus 600 can be implemented with the kinematic assessment machine 100 or the paper document authenticator 402 shown in FIG. 1. FIG. 6 does not limit the scope of this disclosure to any particular implementation of an electronic device.

As shown in FIG. 6, a "see through" apparatus 600 can be used to identify kinematic defects in addition to alignment marks. The "see through" apparatus 600 includes a first scanning element 502 and an illumination element 604. A paper document 104 can be inserted between the first scanning element 502 and the illumination element 604. The paper document can be stationary or moving through the apparatus 600 during imaging operations. Each of the first scanning element 502 and the illumination element 604 can include one or more of sensors 214 including one or more cameras 216 (optical sensor), one or more infrared sensors 218, one or more contact image sensors 220, one or more charge-coupled device 222, or one or more of any other suitable imaging sensors.

The "see through" apparatus 500 can also include one or more processors 202, one or more storage devices 204, one or more communications units 206, and one or more I/O units 208. The first scanning element 502 can be operatively coupled to one or more first processors 202a, one or more first storage devices 204a, one or more first communications units 206a, and one or more first I/O units 208a. The illumination element 604 can be operatively coupled to one or more second processors 202a, one or more second storage devices 204a, one or more second communications units 206a, and one or more second I/O units 208a.

The processors 202 can control illumination and imaging operations of the first scanning element 502 and the illumination element 604. In certain embodiments, a first processor 202a can operate the first scanning element 502 separately from a second processor 202*b* operating the illumination element 604. The processors 202*a* and 202*b* can communicate using a first communication unit 206*a* and a second communication unit 206*b*. The processors 202*a* and 202*b* can store the images captured by the first scanning element 502 in a first memory 204*a* and a second memory 204*b*. The first memory 204*a* and the second memory 204*b* can include instructions to cause the processors 202 to control the first scanning element 502 and the illumination element 604. The first scanning element 502 and the illumination element 604 can be receive inputs and provide outputs through a single I/O unit 208 or the first scanning element can receive inputs and provide output from a first I/O unit 208*a* separate from a second I/O unit 208*b*.

The illumination element 604 can include a light or other illumination component. As the paper document 104 is inserted between the first scanning element 502 and the illumination element 604, the illumination element 604 can operate the light or other illumination component while the first scanning element 502 captures one or more images of the paper document 104. Because the light is provided on an opposite side of the paper document from the first scanning element 502, any ink on either side of the paper document 104 is captured by the first scanning element 502.

For a paper document moving through the "see through" apparatus 500, the paper document 104 can be moved a specified amount per imaging operation of the first scanning element 502 and illumination operation of the illumination element 604. In certain embodiments, the paper document 104 can be continuously moved through the "see through" apparatus 500. The first scanning element 502 and illumination element 604 can capture a series of images for the ink on each side of the paper document 104 while traveling through the apparatus 500. In certain embodiments, the first scanning element 502 and the illumination element 604 can be provided capture one or more specific areas of the paper document 104.

Although FIG. 6 illustrate a "see through" apparatus 600, various changes may be made to FIG. 6. For example, the sizes, shapes, and dimensions of the "see through" apparatus 600 and its individual components can vary as needed or desired. Also, the number and placement of various components of the "see through" apparatus 600 can vary as needed or desired. In addition, the "see through" apparatus 600 may be used in any other suitable scanning process and is not limited to the specific processes described above.

Figure 7:
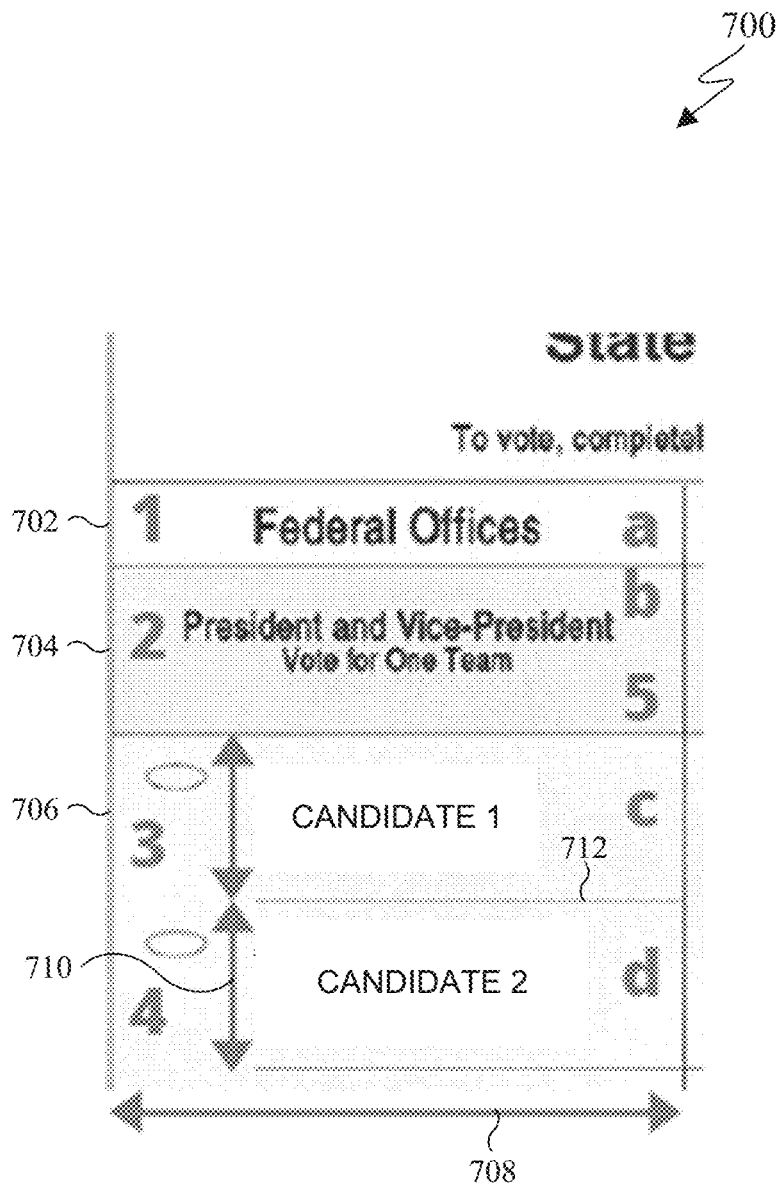
FIG. 7 illustrates an exemplary hard coded rules for a ballot in accordance with this disclosure.

FIG. 7 illustrates an exemplary hard coded rules 700 for a ballot in accordance with this disclosure. The embodiment of the hard coded rules 700 illustrated in FIG. 7 is for illustration only. The hard coded rules 700 can be implemented with the kinematic assessment machine 100 or the paper document authenticator 402 shown in FIG. 1. FIG. 7 does not limit the scope of this disclosure to any particular implementation of an electronic device.

As shown in FIG. 7, hard coded rules 700 can be applied to a paper document or ballot. As a non-limiting example of hard coded rules 700 for a ballot, the kinematic assessment machine 700 can utilize the hard coded rules 700 to print an authentic ballot. Each ballot have hard coded rules applied for an amount of sections and subsection, shading, font, borders, etc. For voting for the race, the ballot can include a first section 702 indicating a level of government (e.g., federal, state, local, etc.), a second section 704 indicating a position to be voted on (e.g., president/vice president, governor, mayor, representative, judge, senator, etc.), and a third section 706 with boxes for each candidate for the specified position (e.g., 1st candidate, 2nd candidate, etc.). The width 708 and heights 710 for each of the sections 702-106 can be defined as hard coded rules 700. The shading shown in the second section 704 can be defined as a hard coded rule. The fonts for each of sections 702-106 can be individually or collectively defined as hard coded rules 700. The borders 712 of the sections 702-706 can be defined as hard coded rules 700. Hard coded rules 700 define the requirement for the ballot printing machine Although FIG. 7 illustrate hard coded rules 700, various changes may be made to FIG. 7. For example, the sizes, shapes, and dimensions of the hard coded rules 700 can vary as needed or desired. Also, the number and placement of various components of the hard coded rules 700 can vary as needed or desired. In addition, the hard coded rules 700 may be used in any other suitable ballot process and is not limited to the specific processes described above.

Figure 8A:
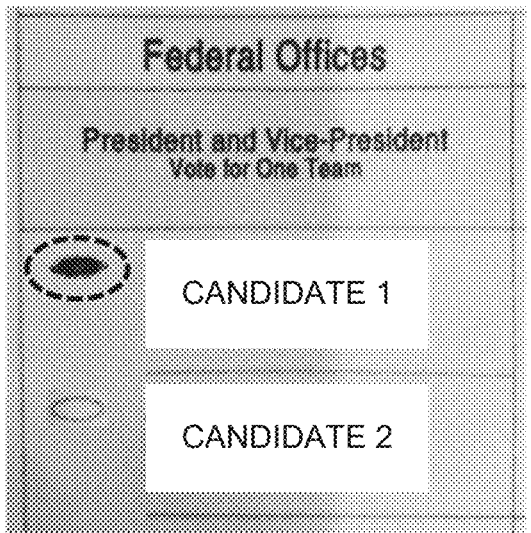
Figure 8B:
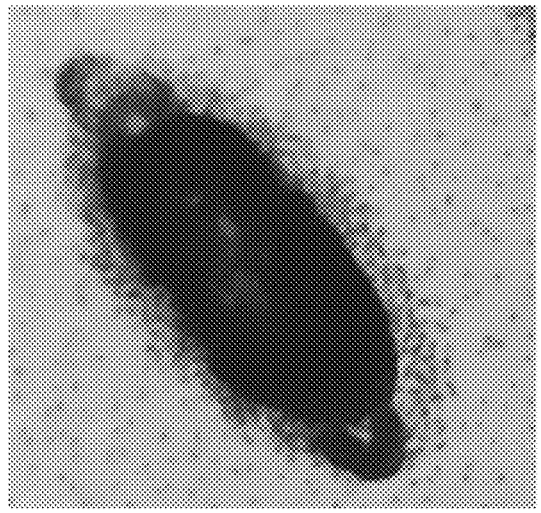
Figure 8C:
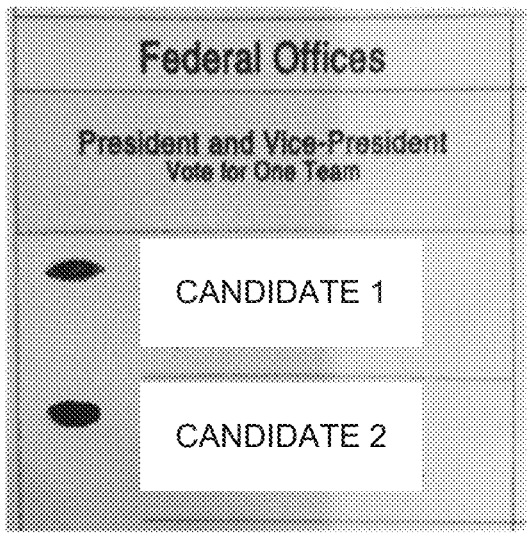
Figure 8D:
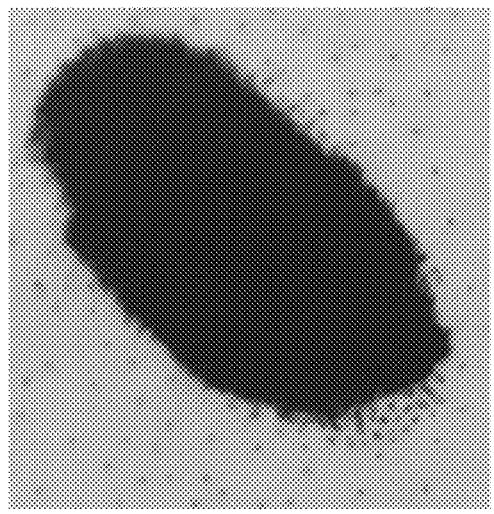
Figure 8E:
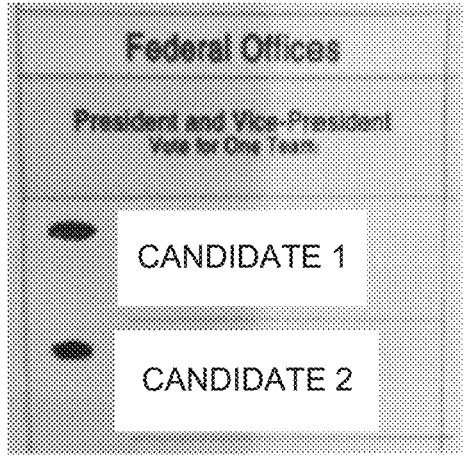
Figure 8F:
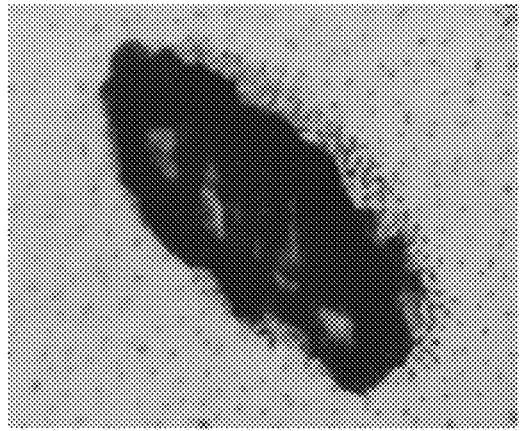
Figure 8G:
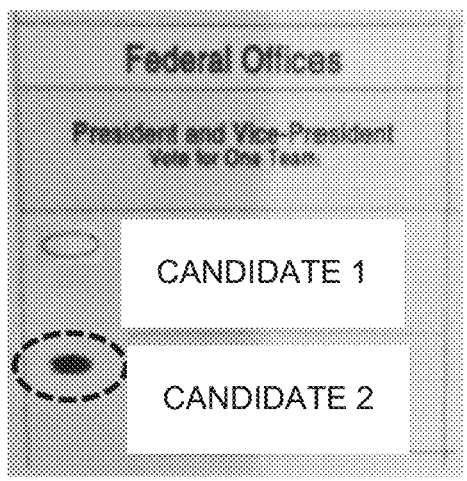
Figure 8H:
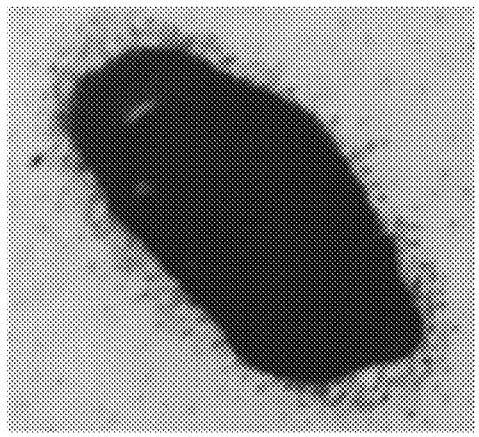

FIGS. 8A through 8L illustrate fill patterns for response area bubbles on paper documents from an eye subject viewpoint and a computer vision analysis in accordance with this disclosure. In particular, FIGS. 8A and 8B illustrate circular fill patterns 800, 802 filled in by humans using a ball point pen for response area bubbles on paper documents, FIGS. 8C and 8D illustrate circular fill patterns 804, 806 filled in by humans using a felt tip pen for response area bubbles on paper documents, FIGS. 8E and 8F illustrate lateral fill patterns 808, 810 filled in by humans using a ball point pen for response area bubbles on paper documents, FIGS. 8G and 8H illustrate circular fill patterns 812, 814 filled in by humans using a gel roller pen for response area bubbles on paper documents, FIGS. 8I and 8J illustrate mechanical printed patterns 816, 818 for response area bubbles on paper documents, and FIGS. 8I and 8J illustrate mechanical printed patterns 820, 822 that mimic human patterns for response area bubbles on paper documents. The embodiments of the patterns 800-822 illustrated in FIGS. 8A through 8L are for illustration only. FIGS. 8A through 8L do not limit the scope of this disclosure to any particular implementation of a fill pattern for a bubble response area.

As shown in FIG. 8A, the kinematic assessment machine 100 has criteria for an example completion fill pattern 800 in a response bubble 814. The completion fill pattern 800 can be defined based on an amount of area for the response bubble 814 that contains markings. For example, the kinematic assessment machine 100 can determine that a response bubble is filled when the completion fill pattern 800 exceeds 95% of the area of the response bubble.

The human eye is a subjective device. The eyes work in harmony with the brain to create images that can be perceived. The eyes are adjusting the focus by bending the light through the lens of the eyeballs and can translate photons of light into an electrical impulse the brain can process. The brain can continuously readjust color balance according to a lighting context. While the eyes translate what is seen into red, white, black, etc., a camera is an absolute measurement device. The light is measured by a series of sensors and the signals recorded are adjust to suit the color temperature of the light illuminating a scene.

As illustrated in the computer vision analysis of FIGS. 8B, 8D, 8F, 8H, 8J, and 8L, details can be processed that are not visible by a human eye without magnification. Dots can be included on the ballot using a mechanical digital printing process.

Although FIGS. 8A through 8L illustrate fill patterns for response area bubbles on paper documents, various changes may be made to FIGS. 8A through 8L. For example, the sizes, shapes, and dimensions of the fill patterns can vary as needed or desired. Also, the number and placement of various fill patterns can vary as needed or desired. In addition, the fill patterns may be used in any other suitable paper document authentication process and is not limited to the specific processes described above.

Figure 9A:
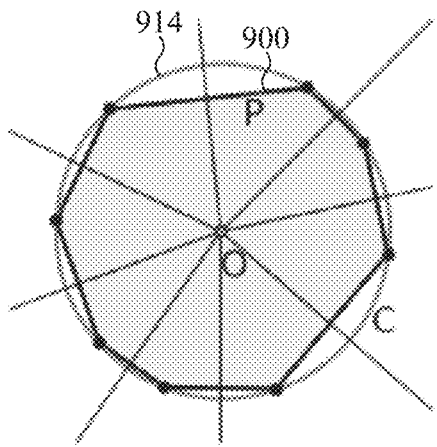
FIGS. 9A through 9G illustrate fill patterns for response area bubbles on paper documents in accordance with this disclosure.
Figure 9B:
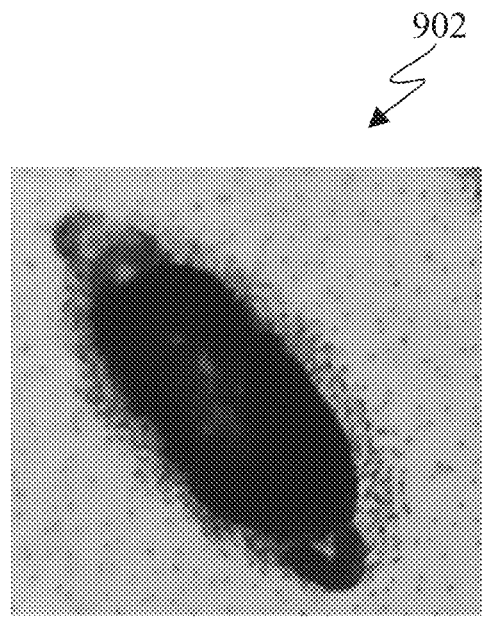
Figure 9C:
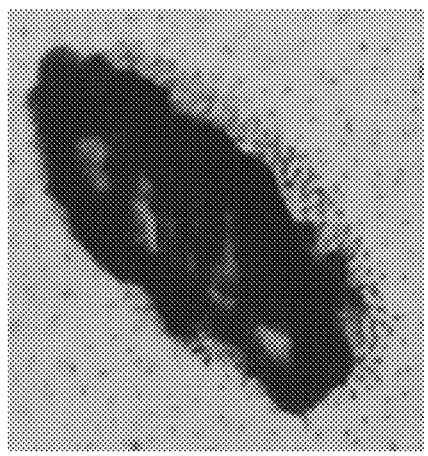
Figure 9D:
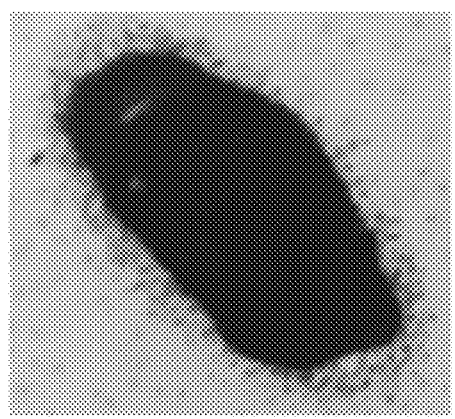
Figure 9E:
Figure 9E:
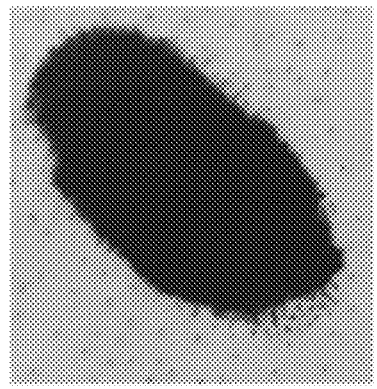
Figure 9F:
Figure 9F:
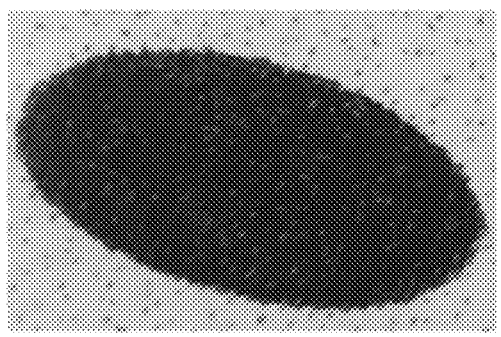
Figure 9G:
Figure 9G:
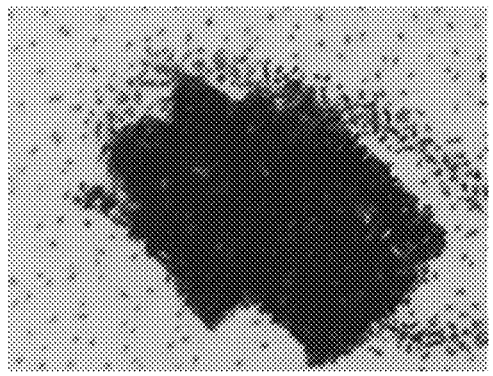

FIGS. 9A through 9B illustrate fill patterns for response area bubbles on paper documents in accordance with this disclosure. In particular, FIG. 9A illustrates an example completion fill pattern 900, FIG. 9B illustrates a ball point pen fill pattern 902 using a circular strokes, FIG. 9C illustrates a black ball point pen fill pattern 904 using lateral strokes, FIG. 9D illustrates a gel roller pen fill pattern 906 using lateral strokes, FIG. 9E illustrates a felt tip pen fill pattern 908 using lateral strokes, FIG. 9F illustrates a mechanical printed pattern 910, and FIG. 9G illustrates a randomized mechanical printed pattern 912. The embodiments of the patterns 900-1012 illustrated in FIGS. 9A through 9G are for illustration only. FIGS. 9A through 9G do not limit the scope of this disclosure to any particular implementation of a fill pattern for a bubble response area.

As shown in FIG. 9A, the kinematic assessment machine 100 has criteria for an example completion fill pattern 900 in a response bubble 914. The completion fill pattern 900 can be defined based on an amount of area for the response bubble 914 that contains markings. For example, the kinematic assessment machine 100 can determine that a response bubble is filled when the completion fill pattern 900 exceeds 95% of the area of the response bubble.

As shown in FIG. 9B, a ball point pen fill pattern 902 is shown for filling the response bubble 914. The pattern shown used a circular motion to fill in the response bubble. The combination of a circular motion and the ball point pen creates areas of the bubble response that are not filled in or have different vary intensities of darkness of the ink. This is typical for a human applying varying pressure throughout the circular motion.

As shown in FIG. 9C, a black ink fill pattern 904 is shown for filling the response bubble 914. The pattern shown uses a lateral motion to fill in the response bubble. The combination of lateral motion and the ball point pen has similar gaps and varying intensities of ink as the circular motion. However, the gaps are more distinguished in this example. The human eye may not be able to perceive the gaps shown in FIG. 9C.

As shown in FIG. 9D, a gel roller pen fill pattern 906 is shown for filling the response bubble 914. The gel roller pen fill pattern 906 is shown using lateral strokes. Due to the ink output of the gel roller pin, the gaps and variance of the ink is reduced. However, the edges of the bubble are filled in less accurately than the response bubbles filled in using a ball point pen.

As shown in FIG. 9E, a illustrates a felt tip pen fill pattern 908 using lateral strokes is shown for filling the response bubble 914. The felt tip pen has the broadest strokes and dispersion of ink for the different types of illustrated fill patterns. The felt tip pen has the least amount of gaps and the least amount of variance of the ink darkness. However, the felt tip pen also has the highest rate of spread, which affects an ability to remain inside the line of the response bubble 914.

As shown in FIG. 9F, a mechanical printed pattern 910 is shown for filling the response bubble 914. The mechanical printed pattern 910 is shown completely filling in the response bubble 914. The mechanical printed pattern 910 does not have any gaps, is a constant ink darkness through the response bubble 914, and does not have any stray markings outside the response bubble 914. Each of these conditions is separately an example of a computer filling out a response bubble 914.

As shown in FIG. 9G, a randomized mechanical printed pattern 912 is shown for filling the response bubble 914. In order to mask mechanically printing, a randomization can be added to a mechanical printed pattern 910. For instance, the randomized mechanical printed pattern 912 attempts to mimic a ball point pen using lateral strokes. When viewed by the human eye without magnification, the fill pattern would appear to be filled in by a human. However, computer analysis can determine otherwise based on at least the three noted conditions. For example, the randomized mechanical printed pattern 912 has random gaps added and is shown to mark outside the response bubble 914. In order to achieve the mimic affect, the printer uses a series of dots to create the pattern. The dots are noticeable and easily differentiated from smooth strokes created by a ball point pen. Another feature is that, while the pattern appears randomized, the exact pattern is normally repeated. While a near infinite amount of humans could draw the same pattern, the computer analysis would be able to identify unique differences in each of the respective fill patterns by the same or different human hands.

Although FIGS. 9A through 9G illustrate fill patterns for response area bubbles on paper documents, various changes may be made to FIGS. 9A through 9G. For example, the sizes, shapes, and dimensions of the fill patterns can vary as needed or desired. Also, the number and placement of various fill patterns can vary as needed or desired. In addition, the fill patterns may be used in any other suitable paper document authentication process and is not limited to the specific processes described above.

Figure 10A:
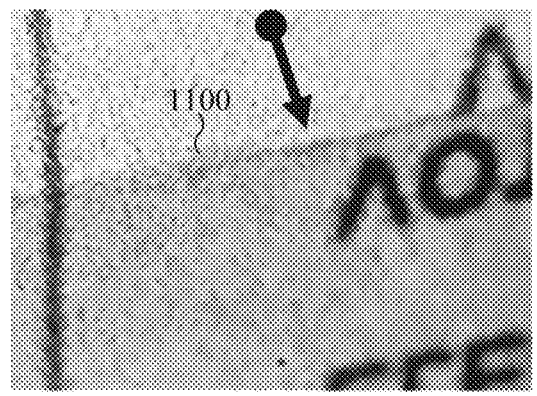
FIGS. 10A through 11C illustrate bending kinematic artifacts in accordance with this disclosure.
Figure 10B:
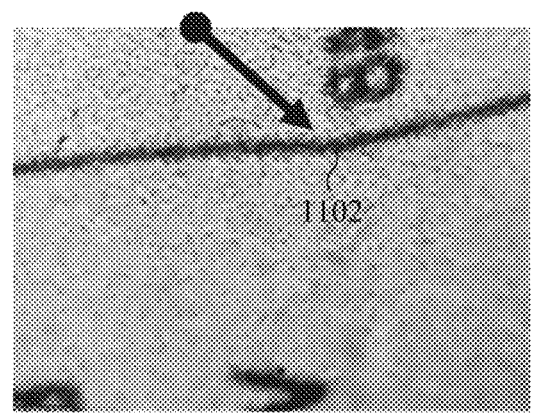
Figure 10C:
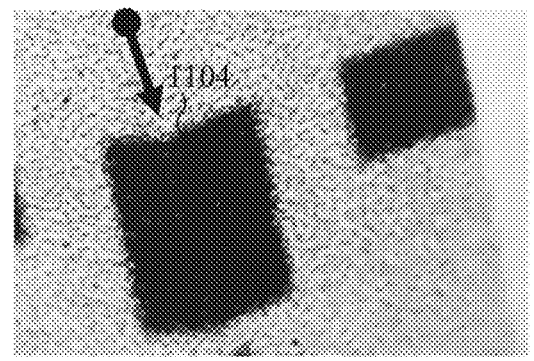
Figure 11A:
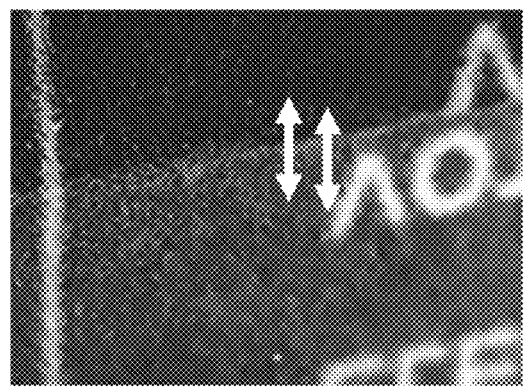
Figure 11B:
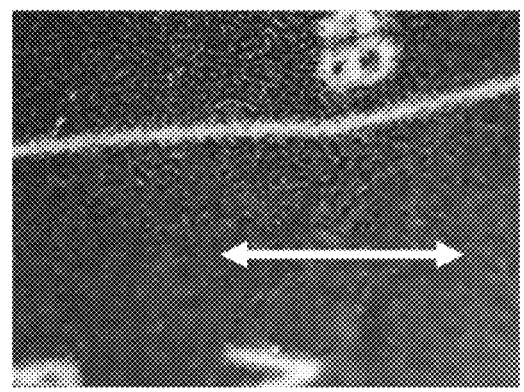
Figure 11C:
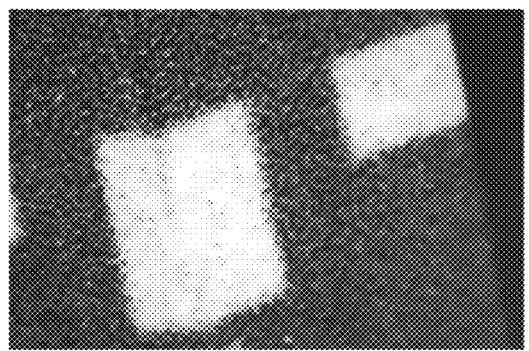
Figure 12A:
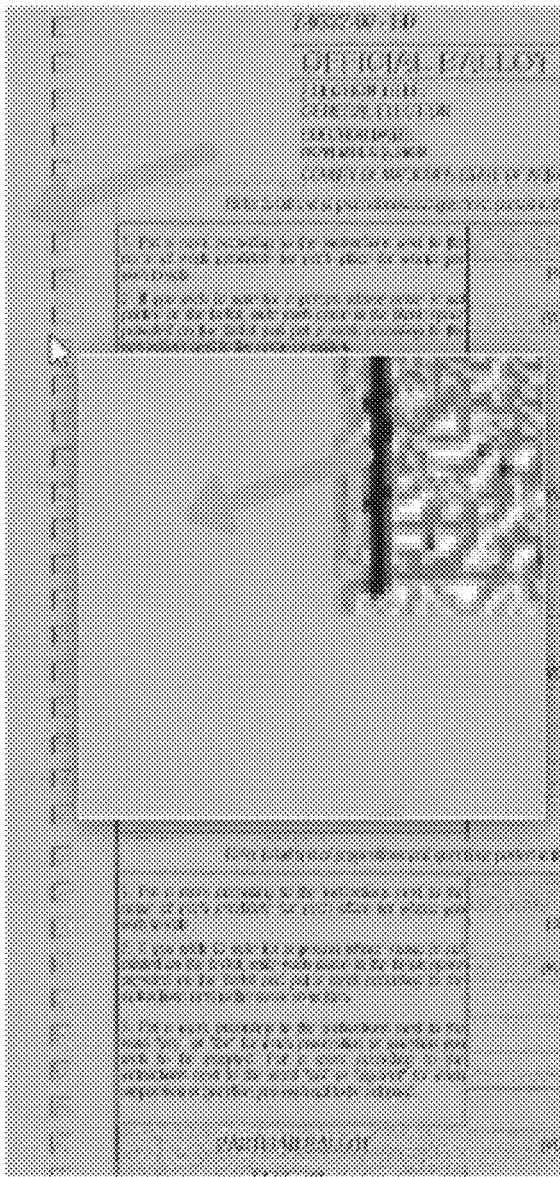
FIGS. 12A through 12F illustrate comparisons of pristine paper document and kinematic artifacts on paper documents in accordance with this disclosure.
Figure 12B:
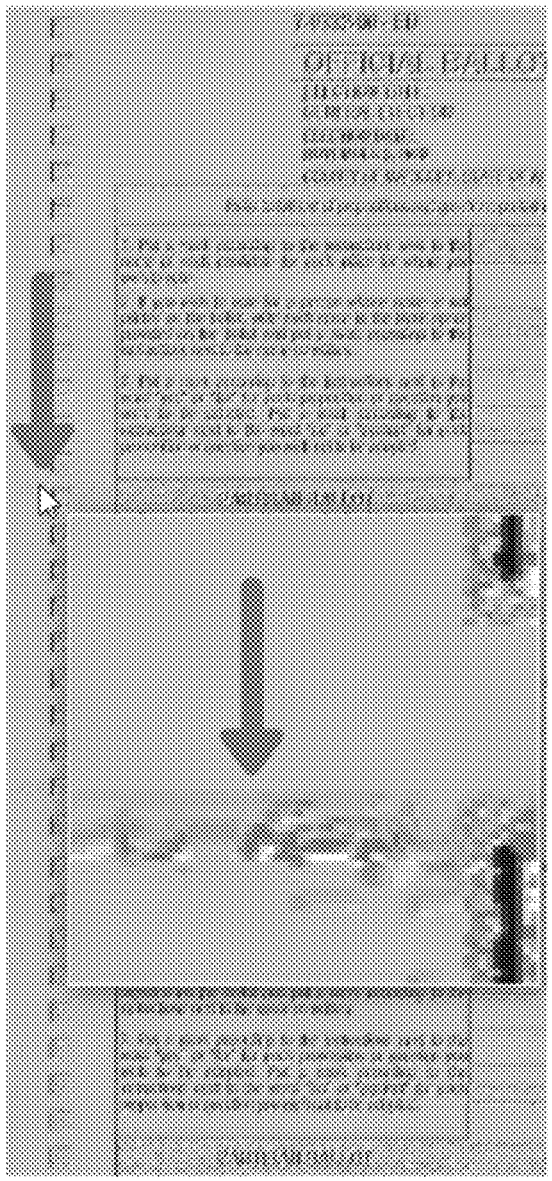
Figure 12C:
Figure 12D:
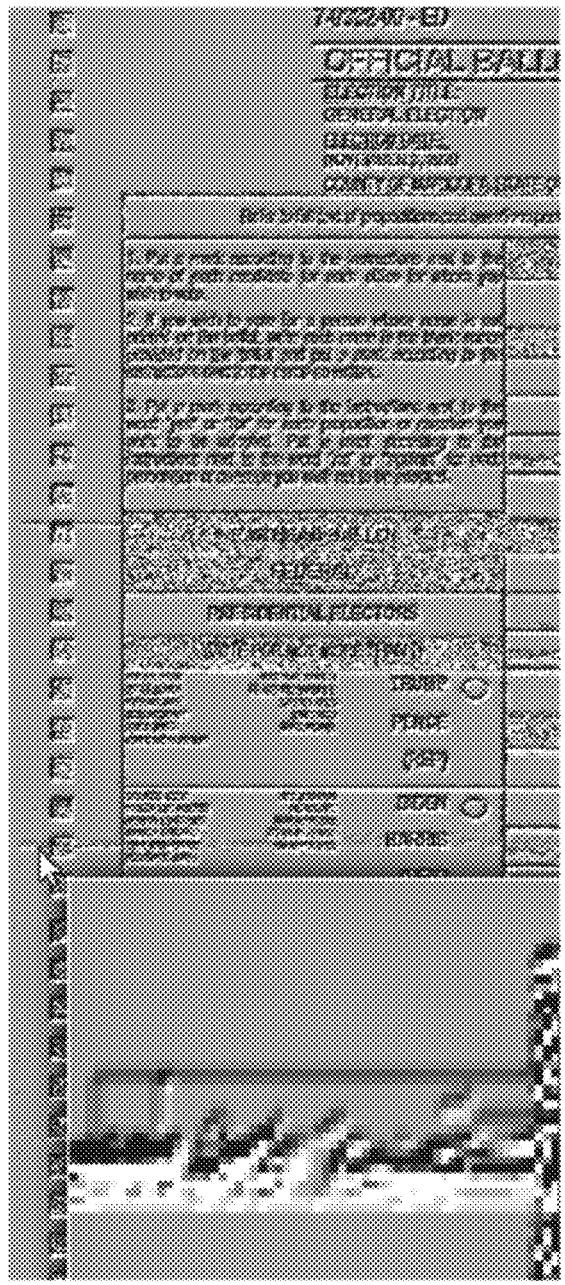
Figure 12E:
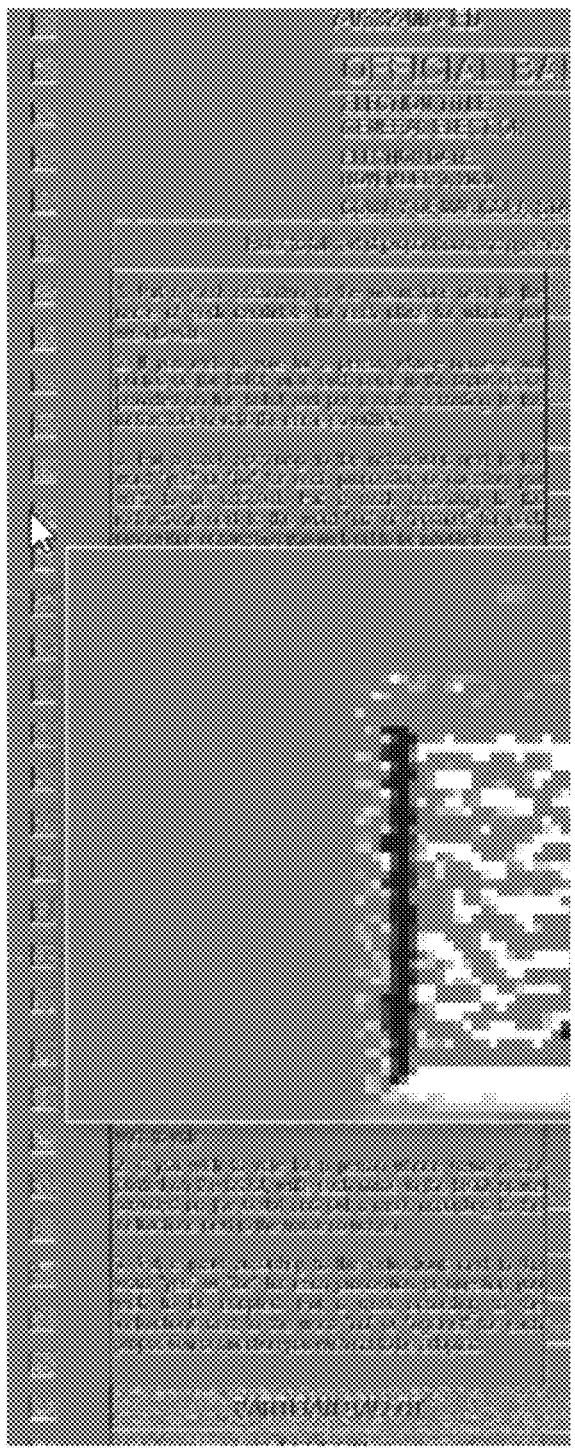
Figure 12F:
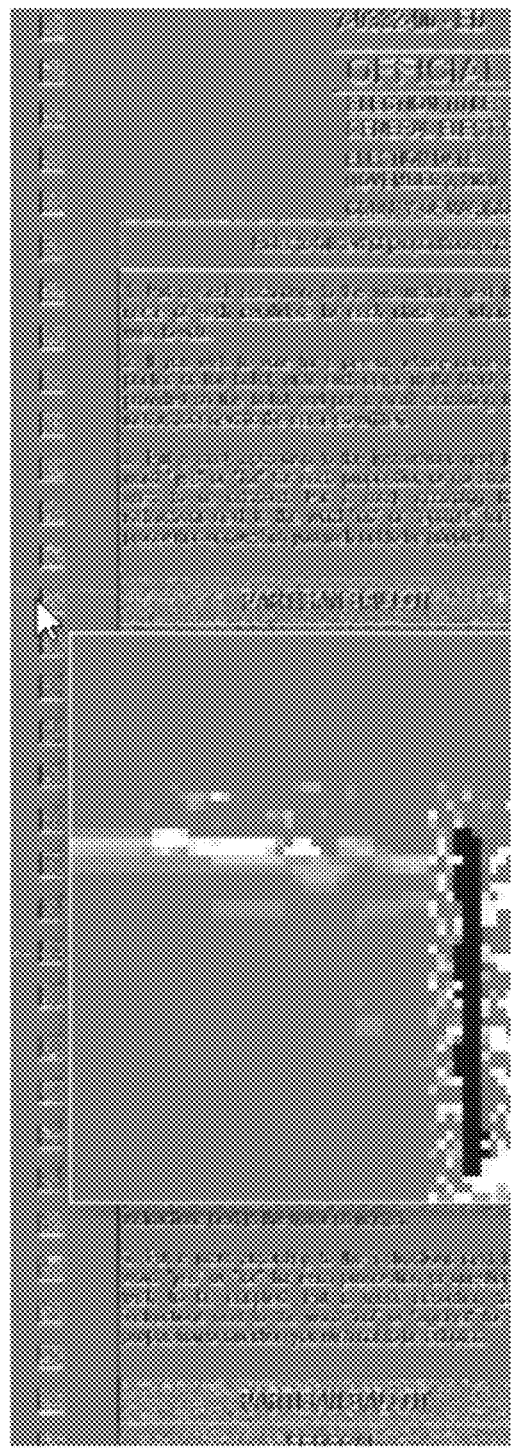

FIGS. 10A through 11C illustrate bending kinematic artifacts in accordance with this disclosure. In particular, FIGS. 10A through 10C illustrate kinematic artifacts 1000-1104 created based on a kinematic event, and FIGS. 11A through 11C illustrate changes in kinematic wavelengths 1300-1304 due to the kinematic event. The embodiments of the kinematic artifacts illustrated in FIGS. 10A through 11C are for illustration only. FIGS. 10A through 11C do not limit the scope of this disclosure to any particular implementation of an electronic device.

As shown in FIGS. 10A through 10C, any paper document 104 that has been folded has kinematic artifacts 1000-1104. In any printing, black and white are opposite codes from each other. When that gets translated to paper the colors are imprinted, no matter the grade of quality of the paper. However, when black is printed and the paper document 104 is subsequently folded, the black code is broken to reveal the white code underneath. The broken black code appears to bend in the light wavelength optically for a digital scanner or optical machine.

As shown in FIGS. 11A through 11C, the kinematic event produces changes in kinematic wavelengths 1300-1304. The nature of a fold, as seen by scanning machines, changes the light spectrum. This change in the light spectrum reveals the kinematic features. The change in the light spectrum also makes opposing sides of the fold become a different light frequency (temperature) due to the man-made deformation of the paper. The kinematic assessment machine 100 can identify these changes in the light spectrum even when the paper is compressed fed.

FIG. 10A illustrates a kinematic fold 1000 of a page. When the paper document is folded, the threads of the paper get deformed in a manner that cannot be easily undone. Most likely, the paper document would need to be remanufactured to completely remove the kinematic features of a bend line. FIG. 11A show the change in the kinematic wavelength 1100 of the kinematic fold 1000.

FIG. 10B illustrates a kinematic bend 1002 in a line where a paper document 104 has experience a kinematic event. The line on the paper appears to bend at the kinematic bend 1002 where there was not a bend in the line prior to the kinematic event. FIG. 11B shows the change in kinematic wavelength 1102 of the kinematic bend 1002.

FIG. 10C illustrates a kinematic indentation 1004 in a solid print object. The box on the paper document 104 appears to have an indentation. FIG. 11C shows the change in kinematic wavelength 1104 of the kinematic indentation 1004.

Although FIGS. 10A through 11C illustrate a kinematic artifacts, various changes may be made to FIGS. 10A through 11C. For example, the sizes, shapes, and dimensions of the kinematic artifacts 1000-1104 can vary. Also, the number and placement of various components of the kinematic artifacts 1000-1104 can vary.

FIGS. 12A through 12F illustrate comparisons of pristine paper document and kinematic artifacts on paper documents in accordance with this disclosure. The embodiments of the pristine paper document and kinematic artifacts on paper documents illustrated in FIGS. 12A through 12F are for illustration only. FIGS. 12A through 12F do not limit the scope of this disclosure to any particular implementation of an electronic device.

As shown in FIGS. 12A through 12F, illustrates a comparison of an unfolded paper document with a folded paper document. The unfolded paper document (left image of each page) does not appear to show a fold. The fold kinematic artifact (right image of each page) shows that the paper documented has been previously folded.

Although FIGS. 12A through 12F illustrate a comparisons of pristine paper document and kinematic artifacts on paper documents, various artifacts may be found on paper documents from what is illustrated in FIGS. 12A through 12F. For example, the sizes, shapes, and dimensions of the kinematic artifacts can vary. Also, the number and placement of various components of the kinematic artifacts can vary.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U. S.C. § 112(f) with respect to any of the appended claims or claim elements unless the exact words "means for" or "step for" are explicitly used in the particular claim, followed by a participle phrase identifying a function.

It will be appreciated by those skilled in the art having the benefit of this disclosure that this automated fraud assessment of kinematic elements provides a device and process for making a determination of a paper document that has been processed through the postal system. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A see through apparatus configured to receive a paper document includes:
    a first scanning element configured to:
        illuminate a first side of a paper document, and
        capture a first image of the first side of the paper document;
    a second scanning element configured to:
        capture a second image of ink on both sides of the paper document from a second side of the paper document based on the first scanning element illuminating the first side of the paper document, and
        illuminate the second side of the paper document while the first scanning element captures the first image of the ink on both sides of the paper document from the first side of the paper document; and
    at least one processor operably coupled to the first scanning element and the second scanning element, the at least one processor configured to:
        detect kinematic artifacts on the paper document,
        determine that the paper document is fraudulent based on the detected kinematic artifacts,
        detect an alignment feature from the image capture from the first image or the second image, and
        determine that the document is not aligned based on the detected alignment feature.

* * * * *